United States Patent
Rafrafi et al.

(10) Patent No.: US 11,933,915 B2
(45) Date of Patent: *Mar. 19, 2024

(54) RADAR DETECTION SYSTEM FOR NON-CONTACT HUMAN ACTIVATION OF POWERED CLOSURE MEMBER

(71) Applicant: MAGNA CLOSURES INC., Newmarket (CA)

(72) Inventors: Wassim Rafrafi, Newmarket (CA); Samuel R. Baruco, Aurora (CA)

(73) Assignee: MAGNA CLOSURES INC., Newmarket (CA)

( * ) Notice: Subject to any disclaimer, the term of this patent is extended or adjusted under 35 U.S.C. 154(b) by 165 days.

This patent is subject to a terminal disclaimer.

(21) Appl. No.: 17/354,100

(22) Filed: Jun. 22, 2021

(65) Prior Publication Data
US 2021/0311168 A1 Oct. 7, 2021

Related U.S. Application Data

(63) Continuation of application No. 16/262,359, filed on Jan. 30, 2019, now Pat. No. 11,067,667, which is a (Continued)

(51) Int. Cl.
*G01S 7/41* (2006.01)
*B60Q 1/50* (2006.01)
(Continued)

(52) U.S. Cl.
CPC ............ *G01S 7/415* (2013.01); *B60Q 1/5035* (2022.05); *B60R 25/2054* (2013.01);
(Continued)

(58) Field of Classification Search
USPC .......................................................... 701/49
See application file for complete search history.

(56) References Cited

U.S. PATENT DOCUMENTS 4,009,476 A  2/1977 Lutz
5,371,659 A  12/1994 Pastrick et al.
(Continued)

FOREIGN PATENT DOCUMENTS

CN  110095772 A  8/2019
DE  102005017250 A1  6/2006
(Continued)

OTHER PUBLICATIONS

S. Rao, "Introduction to mmwave Sensing: FMCW Radars", Texas Instruments (TI) mmWave Training Series, Apr. 2017, retrieved on-line at https://training.ti.com/sites/default/files/docs/mmwaveSensing-FMCW--0fflineviewing_3.pdf.

*Primary Examiner* — Tyler D Paige
(74) *Attorney, Agent, or Firm* — Dickinson Wright PLLC

(57) ABSTRACT

A radar detection system for activation of a powered closure member of a vehicle and corresponding method are provided. The system includes a radar sensor assembly having a radar transmit antenna for transmitting radar waves and a radar receive antenna for receiving the radar waves after reflection from an object in a detection zone. The radar sensor assembly outputs a sensor signal corresponding to the motion of the object in the detection zone. An electronic control unit is coupled to the radar sensor assembly and includes a data acquisition module to receive the sensor signal and a plurality of analysis modules to analyze the sensor signal to detect extracted features and determine whether extracted features are within predetermined thresholds representing a valid activation gesture. The electronic control unit initiates movement of the closure member in response to the extracted features being within the predetermined thresholds representing the valid activation gesture.

20 Claims, 29 Drawing Sheets

Related U.S. Application Data continuation-in-part of application No. 15/896,426, filed on Feb. 14, 2018, now abandoned, which is a continuation-in-part of application No. 15/696,657, filed on Sep. 6, 2017, now Pat. No. 10,246,009.

(60) Provisional application No. 62/624,224, filed on Jan. 31, 2018, provisional application No. 62/610,655, filed on Dec. 27, 2017, provisional application No. 62/460,247, filed on Feb. 17, 2017, provisional application No. 62/384,930, filed on Sep. 8, 2016.

(51) Int. Cl.

| | | |
|---|---|---|
| *B60R 25/20* | (2013.01) | |
| *E05F 15/73* | (2015.01) | |
| *E05F 15/76* | (2015.01) | |
| *G01S 7/03* | (2006.01) | |
| *G01S 7/35* | (2006.01) | |
| *G01S 13/34* | (2006.01) | |
| *G01S 13/56* | (2006.01) | |
| *B60J 5/10* | (2006.01) | |

(52) U.S. Cl.
CPC .............. *E05F 15/73* (2015.01); *E05F 15/76* (2015.01); *G01S 7/032* (2013.01); *G01S 7/352* (2013.01); *G01S 7/417* (2013.01); *G01S 13/343* (2013.01); *G01S 13/56* (2013.01); *B60J 5/10* (2013.01); *E05Y 2400/44* (2013.01); *E05Y 2400/45* (2013.01); *E05Y 2400/858* (2013.01); *E05Y 2900/531* (2013.01); *E05Y 2900/546* (2013.01); *G01S 7/356* (2021.05)

(56) References Cited

U.S. PATENT DOCUMENTS

| | | | |
|---|---|---|---|
| 5,497,305 A | 3/1996 | Pastrick et al. | |
| 5,669,699 A | 9/1997 | Pastrick et al. | |
| 5,823,654 A | 10/1998 | Pastrick et al. | |
| 5,845,000 A | 12/1998 | Breed et al. | |
| 5,973,611 A | 10/1999 | Kulha | |
| 6,206,340 B1 | 3/2001 | Paese et al. | |
| 6,225,891 B1 | 5/2001 | Lyons et al. | |
| 6,349,450 B1 | 2/2002 | Koops et al. | |
| 6,435,600 B1 | 8/2002 | Long et al. | |
| 6,550,103 B2 | 4/2003 | Koops et al. | |
| 7,049,945 B2 | 5/2006 | Breed et al. | |
| 7,660,437 B2 | 2/2010 | Breed | |
| 7,783,403 B2 | 8/2010 | Breed | |
| 8,154,418 B2 | 4/2012 | Peterson et al. | |
| 9,335,825 B2 | 5/2016 | Rautiainen et al. | |
| 9,340,197 B1 | 5/2016 | Miersch-Wiemers et al. | |
| 9,436,880 B2 | 9/2016 | Bos et al. | |
| 9,470,033 B1 * | 10/2016 | Dudar ..................... E05F 15/73 | |
| 9,519,351 B2 | 12/2016 | Gossweiler et al. | |
| 9,580,046 B2 | 2/2017 | Luu et al. | |
| 9,610,912 B2 | 4/2017 | Schaaf | |
| 9,646,436 B1 | 5/2017 | Campbell et al. | |
| 9,777,528 B2 | 10/2017 | Elie et al. | |
| 9,854,227 B2 | 12/2017 | Grossman et al. | |
| 9,921,657 B2 | 3/2018 | Sprenger et al. | |
| 9,972,150 B2 | 5/2018 | Da Deppo et al. | |
| 10,176,368 B1 | 1/2019 | Ramakrishnan | |
| 10,246,009 B2 | 4/2019 | McMahon et al. | |
| 10,308,167 B2 | 6/2019 | Caron | |
| 10,379,621 B2 | 8/2019 | Schwesig et al. | |
| 10,432,194 B2 | 10/2019 | Bar et al. | |
| 10,480,221 B2 | 11/2019 | Cumbo | |
| 10,514,770 B2 | 12/2019 | Malysa et al. | |
| 10,934,764 B2 * | 3/2021 | Rafrafi ..................... G01S 7/415 | |
| 2001/0052839 A1 | 12/2001 | Nahata | |
| 2003/0193388 A1 | 10/2003 | Ghabra | |
| 2005/0096831 A1 | 5/2005 | Turnbull | |
| 2007/0024416 A1 | 2/2007 | Tang | |
| 2007/0132552 A1 | 6/2007 | Kurpinski | |
| 2010/0052848 A1 | 3/2010 | Thunes | |
| 2010/0191391 A1 | 7/2010 | Zeng | |
| 2010/0228447 A1 | 9/2010 | Serban | |
| 2010/0304690 A1 | 12/2010 | Proefke | |
| 2011/0276234 A1 * | 11/2011 | Van Gastel ............. E05F 15/73 |
| | | | 701/49 |
| 2012/0249291 A1 | 10/2012 | Holcomb | |
| 2013/0131917 A1 * | 5/2013 | Fuchs .................... B60R 25/10 |
| | | | 701/36 |
| 2014/0019913 A1 | 1/2014 | Newman | |
| 2014/0136024 A1 | 5/2014 | Herthan | |
| 2014/0207344 A1 | 7/2014 | Ihlenburg et al. | |
| 2014/0274147 A1 * | 9/2014 | Kennedy ............... H04L 51/214 |
| | | | 455/456.3 |
| 2014/0309878 A1 | 10/2014 | Ricci | |
| 2015/0009062 A1 * | 1/2015 | Herthan .................. G01S 7/415 |
| | | | 342/70 |
| 2015/0097798 A1 | 4/2015 | Ricci | |
| 2015/0316680 A1 | 11/2015 | Sieg | |
| 2015/0336521 A1 | 11/2015 | Tofilescu | |
| 2016/0046298 A1 * | 2/2016 | DeRuyck ............. G06V 20/597 |
| | | | 340/576 |
| 2016/0083995 A1 | 3/2016 | Dezorzi et al. | |
| 2016/0137165 A1 | 5/2016 | Schindler et al. | |
| 2016/0169708 A1 * | 6/2016 | Sterk .................... H03K 17/955 |
| | | | 324/658 |
| 2016/0252607 A1 | 9/2016 | Saboo et al. | |
| 2016/0320852 A1 | 11/2016 | Poupyrev | |
| 2017/0060254 A1 | 3/2017 | Molchanov et al. | |
| 2017/0075019 A1 | 3/2017 | Pribisic et al. | |
| 2017/0101076 A1 | 4/2017 | Krishnan | |
| 2017/0124407 A1 | 5/2017 | Micks et al. | |
| 2017/0124859 A1 | 5/2017 | Lee | |
| 2017/0152697 A1 * | 6/2017 | Dehelean ................ E05F 15/73 |
| 2017/0167180 A1 | 6/2017 | Bingle et al. | |
| 2017/0190336 A1 | 7/2017 | Vijayan et al. | |
| 2017/0197636 A1 | 7/2017 | Beauvais | |
| 2017/0200335 A1 * | 7/2017 | Da Deppo ........... G07C 9/00309 |
| 2017/0232932 A1 | 8/2017 | Nishidai et al. | |
| 2017/0247933 A1 | 8/2017 | Elie et al. | |
| 2017/0270924 A1 | 9/2017 | Fleurence et al. | |
| 2017/0293025 A1 | 10/2017 | Davis et al. | |
| 2017/0306684 A1 | 10/2017 | Baruco et al. | |
| 2017/0307728 A1 | 10/2017 | Eshraghi et al. | |
| 2017/0310758 A1 | 10/2017 | Davis et al. | |
| 2017/0316281 A1 | 11/2017 | Criminisi et al. | |
| 2017/0328116 A1 | 11/2017 | Herthan | |
| 2018/0030771 A1 * | 2/2018 | Washeleski ............. E05F 15/40 |
| 2018/0065545 A1 | 3/2018 | McMahon et al. | |
| 2018/0170309 A1 * | 6/2018 | McMahon ............... G01S 13/88 |
| 2018/0218545 A1 | 8/2018 | Garcia et al. | |
| 2018/0238099 A1 | 8/2018 | Schatz et al. | |
| 2018/0241394 A1 | 8/2018 | Virnich et al. | |
| 2018/0248525 A1 | 8/2018 | Orr | |
| 2018/0347252 A1 | 12/2018 | Zeabari et al. | |
| 2018/0367139 A1 | 12/2018 | Pribisic et al. | |
| 2019/0087009 A1 | 3/2019 | Rao et al. | |
| 2019/0101634 A1 | 4/2019 | Baheti et al. | |
| 2019/0128040 A1 | 5/2019 | Mitchell | |
| 2019/0152433 A1 | 5/2019 | Cumbo | |
| 2019/0153770 A1 | 5/2019 | Mitchell et al. | |
| 2019/0154439 A1 | 5/2019 | Binder | |
| 2019/0162010 A1 * | 5/2019 | Rafrafi ..................... B60J 5/101 |
| 2019/0162821 A1 | 5/2019 | Rafrafi et al. | |
| 2019/0162822 A1 | 5/2019 | Rafrafi et al. | |
| 2019/0309564 A1 | 10/2019 | Mitchell et al. | |
| 2019/0375358 A1 | 12/2019 | Lee et al. | |
| 2019/0391251 A1 | 12/2019 | Bharadwaj et al. | |
| 2020/0011096 A1 | 1/2020 | Leonardi et al. | |
| 2020/0018111 A1 | 1/2020 | Akbarian et al. | |

(56) References Cited

U.S. PATENT DOCUMENTS

2020/0072947 A1    3/2020   Miu et al.
2020/0088839 A1    3/2020   Miu et al.

FOREIGN PATENT DOCUMENTS

| DE | 102018202274 A1 | 8/2018 |
|----|-----------------|--------|
| EP | 3267291 A2 | 1/2018 |
| WO | 2011044312 A1 | 4/2011 |
| WO | 2012051500 A1 | 4/2012 |
| WO | 2013071070 A1 | 5/2013 |
| WO | 2013082806 A1 | 6/2013 |
| WO | 2015148611 A1 | 10/2015 |
| WO | 2016138238 A1 | 9/2016 |
| WO | 2016170005 A1 | 10/2016 |
| WO | 2016205217 A1 | 12/2016 |
| WO | 2017187243 A1 | 11/2017 |
| WO | 2017187330 A1 | 11/2017 |
| WO | 2017187331 A1 | 11/2017 |

* cited by examiner

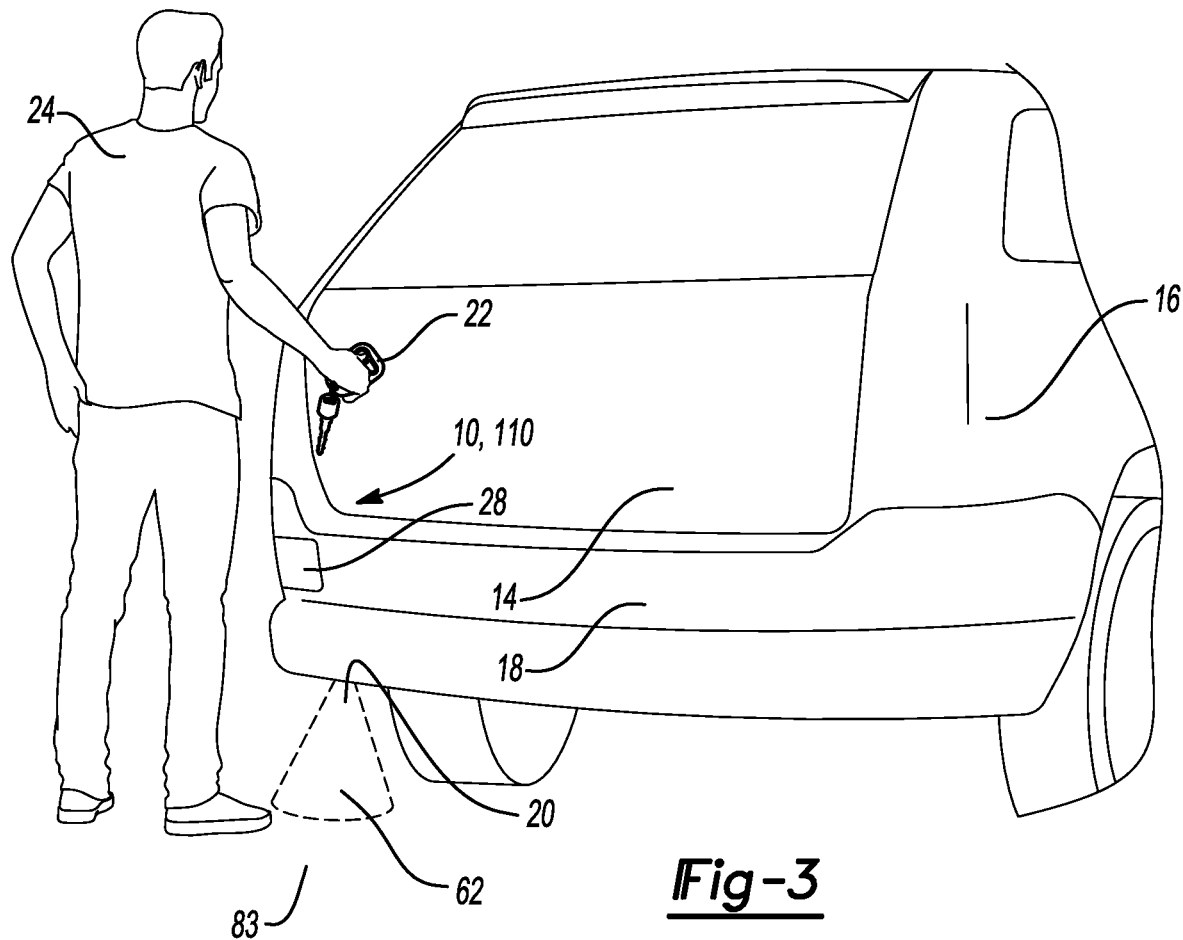
_Fig-3_
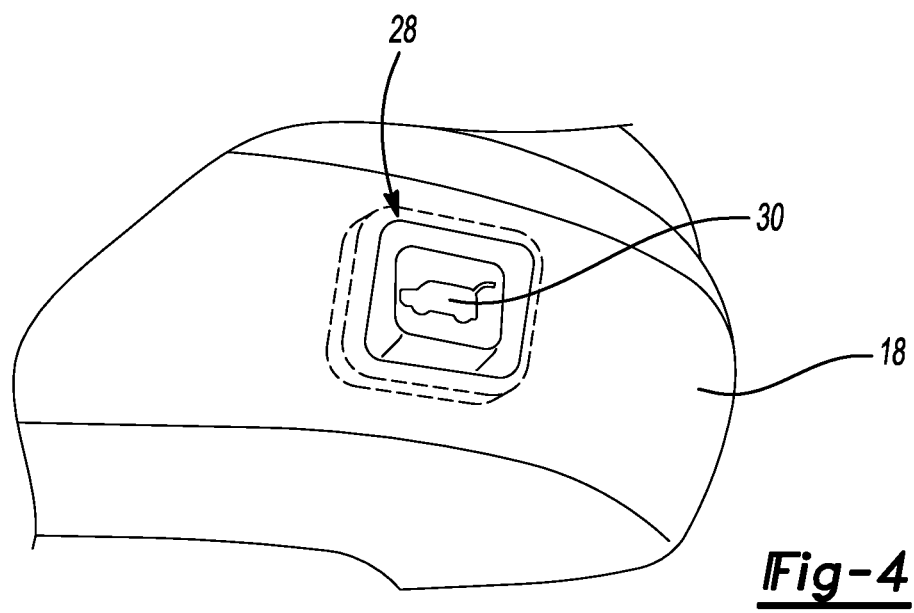
_Fig-4_

RADAR DETECTION SYSTEM FOR NON-CONTACT HUMAN ACTIVATION OF POWERED CLOSURE MEMBER

CROSS-REFERENCE TO RELATED APPLICATIONS

This utility application is a continuation of U.S. patent application Ser. No. 16/262,359 filed Jan. 30, 2019, which is a continuation-in-part of U.S. patent application Ser. No. 15/896,426 filed Feb. 14, 2018, which is a continuation-in-part of U.S. patent application Ser. No. 15/696,657 filed Sep. 6, 2017, which claims the benefit of U.S. Provisional Application No. 62/384,930 filed on Sep. 8, 2016, U.S. Provisional Application No. 62/460,247 filed on Feb. 17, 2017, and U.S. Provisional Application No. 62/610,655 filed on Dec. 27, 2017. This utility application also claims the benefit of U.S. Provisional Application No. 62/624,224 filed Jan. 31, 2018. The entire disclosures of the above applications are incorporated herein by reference.

FIELD

The present disclosure relates generally to radar detection systems for motor vehicles and, more particularly, to a radar detection system for user-activated, non-contact activation of a powered closure member for moving the closure member relative to a vehicle body between a closed position and an open position.

BACKGROUND

This section provides background information related to the present disclosure which is not necessarily prior art.

Motor vehicles can be designed to include a user-activated, non-contact powered system for automatically opening a closure member, such as a rear liftgate of the vehicle. The powered system can be activated by a detection system including a sensor to detect motion of the user desiring to open the rear liftgate, for example a kicking motion of the user's foot beneath a rear bumper. Various sending technologies can be employed in order to detect the motion of the user desiring to move the closure member including ultrasonic sensors. However, such sensors typically require that the appearance of the vehicle body be altered to provide openings for the ultrasonic signals to be emitted from the vehicle so that the vehicle body or trim does not interfere with the ultrasonic signals.

Available systems may also include technology to confirm the user, who is in possession of a key fob associated with the vehicle, is the source of the motion, so that the rear liftgate is not incorrectly activated, for example by another human, animal, weather conditions, or objects which could enter the space beneath the bumper. The systems can allow for convenient, user-friendly opening of the rear liftgate when the user's hands are occupied, for example when the user is holding items to be loaded in the vehicle. Nevertheless, the detection systems which are currently available could be improved.

SUMMARY

This section provides a general summary of the present disclosure and is not a comprehensive disclosure of its full scope or all of its features, aspects and objectives.

Accordingly, it is an aspect of the present disclosure to provide a radar detection system for user-activated, non-contact activation of a powered closure member coupled to a vehicle body of a vehicle. The system includes at least one radar sensor assembly including at least one radar transmit antenna for transmitting radar waves and at least one radar receive antenna for receiving the radar waves after reflection from an object in a detection zone. The at least one radar sensor assembly is coupled to the vehicle body for sensing a motion of the object in the detection zone and outputting a sensor signal corresponding to the motion of the object in the detection zone. An electronic control unit is coupled to the at least one radar sensor assembly and including a data acquisition module to receive the sensor signal corresponding to the motion of the object from the at least one radar sensor assembly. The electronic control unit includes a plurality of analysis modules coupled to the data acquisition module to analyze the sensor signal to detect a plurality of extracted features and determine whether the plurality of extracted features are within a plurality of predetermined thresholds representing a valid activation gesture by a user required to move the closure member. The electronic control unit is also configured to initiate movement of the closure member in response to the plurality of extracted features being within the plurality of predetermined thresholds representing the valid activation gesture.

It is another aspect of the present disclosure to provide a method of operating a radar detection system for user-activated, non-contact operation of a closure member coupled to a vehicle body of a vehicle. The method includes the step of transmitting radar waves using least one radar transmit antenna of at least one radar sensor assembly. The method continues by receiving the radar waves after reflection from an object in a detection zone and coupled to the vehicle body using at least one radar receive antenna of the at least one radar sensor assembly. Next, the method includes the step of sensing a motion and characteristics of the object in the detection zone based on the radar waves received. The method then proceeds with the step of outputting a sensor signal corresponding to the motion and characteristics of the object in the detection zone. The method also includes receiving the sensor signal corresponding to the motion and characteristics of the object and characteristics from the at least one radar sensor assembly using a data acquisition module of an electronic control unit coupled to the at least one radar sensor assembly. The method continues with the step of analyzing the sensor signal to detect a plurality of extracted features using a plurality of analysis modules of the electronic control unit. The next step of the method is determining whether the plurality of extracted features are within a plurality of predetermined thresholds representing a valid activation gesture by a user required to move the closure member using the plurality of analysis modules. The method concludes by initiating movement of the closure member in response to the plurality of extracted features being within the plurality of predetermined thresholds representing the valid activation gesture using the electronic control unit.

It is yet another aspect of the present disclosure to provide another radar detection system for user-activated, non-contact activation of a powered closure member coupled to a vehicle body of a vehicle. The system includes at least one radar sensor assembly including at least one radar transmit antenna for transmitting radar waves and at least one radar receive antenna for receiving the radar waves after reflection from an object in a detection zone and coupled to the vehicle body for sensing a motion and characteristics of the object in the detection zone and outputting a sensor signal corresponding to the motion and characteristics of the object in the detection zone. The system also includes an electronic control unit coupled to the at least one radar sensor assembly and including a data acquisition module to receive the sensor signal corresponding to the motion and characteristics of the object and characteristics from the at least one radar sensor assembly. The electronic control unit includes a plurality of analysis modules coupled to the data acquisition module to analyze the sensor signal to detect a plurality of extracted features. The electronic control unit is also configured to determine whether the plurality of extracted features are within a plurality of predetermined thresholds representing a valid activation gesture by a user required to move the closure member. The system additionally includes an external user interface coupled to at least one of the plurality of analysis modules to enable a user to adjust at least one of the plurality of predetermined thresholds. The electronic control unit is configured to initiate movement of the closure member in response to the plurality of extracted features being within the plurality of predetermined thresholds representing the valid activation gesture and as adjusted by the user.

It is another aspect of the present disclosure to provide another radar detection system for user-activated, non-contact activation of a powered closure member coupled to a vehicle body of a vehicle. The system includes at least one radar sensor assembly including at least one radar transmit antenna for transmitting radar waves and at least one radar receive antenna for receiving the radar waves after reflection from an object in a detection zone and coupled to the vehicle body for sensing a motion of the object in the detection zone and outputting a sensor signal corresponding to the motion of the object in the detection zone. An electronic control unit is coupled to the at least one radar sensor assembly and includes a data acquisition module to receive the sensor signal corresponding to the motion of the object from the at least one radar sensor assembly. The electronic control unit includes a plurality of analysis modules to analyze the sensor signal to detect a plurality of extracted features and match the plurality of extracted features to a plurality predetermined matching classes associated with a valid activation gesture by a user required to move the closure member. The electronic control unit is also configured to initiate movement of the closure member in response to the plurality of extracted features matching at least one of the plurality predetermined matching classes associated with the valid activation gesture.

It is an additional aspect of the present disclosure to provide another method of operating a radar detection system for user-activated, non-contact operation of a closure member coupled to a vehicle body of a vehicle. The method includes the step of transmitting radar waves near the vehicle using at least one radar transmit antenna of at least one radar sensor assembly coupled to the vehicle. The method continues by receiving the radar waves after reflection from an object in a detection zone using at least one radar receive antenna of the at least one radar sensor assembly. The method proceeds with the step of outputting a sensor signal corresponding to motion and characteristics of an object in the detection zone using the at least one radar sensor assembly. The method also includes the step of receiving the sensor signal corresponding to the motion and characteristics of the object from the at least one radar sensor assembly using a data acquisition module of an electronic control unit coupled to the at least one radar sensor assembly. The method continues with the step of analyzing the sensor signal to detect a plurality of extracted features using a plurality of analysis modules of the electronic control unit.

Next, the method includes matching the plurality of extracted features to a plurality predetermined matching classes associated with a valid activation gesture by a user required to move the closure member using the plurality of analysis modules. The method concludes with the step of initiating movement of the closure member in response to the plurality of extracted features matching at least one of the plurality predetermined matching classes associated with the valid activation gesture.

It is yet another aspect of the present disclosure to provide another radar detection system for user-activated, non-contact activation of a powered closure member coupled to a vehicle body of a vehicle. The system includes at least one radar sensor assembly including at least one radar transmit antenna for transmitting radar waves and at least one radar receive antenna for receiving the radar waves after reflection from an object in a detection zone and coupled to the vehicle body for sensing a motion of the object in the detection zone and outputting a sensor signal corresponding to the motion of the object in the detection zone. An electronic control unit is coupled to the at least one radar sensor assembly and including a data acquisition module to receive the sensor signal corresponding to the motion of the object from the at least one radar sensor assembly. The electronic control unit includes a plurality of analysis modules to analyze the sensor signal to detect a plurality of extracted features and match the plurality of extracted features to a plurality predetermined matching classes associated with a valid activation gesture by a user required to move the closure member. The electronic control unit registers the plurality of extracted features as the valid activation gesture in response to the plurality of extracted features matching at least one of a predetermined speed class and a predetermined distance class and a predetermined angle class and the predetermined size class of the plurality predetermined matching classes associated with the valid activation gesture. The electronic control unit is configured to initiate movement of the closure member in response to the plurality of extracted features matching at least one of the plurality predetermined matching classes associated with the valid activation gesture.

It is a further aspect of the present disclosure to provide a method of operating a radar detection system for user-activated, non-contact operation of a closure member coupled to a vehicle body of a vehicle. The method includes the step of transmitting radar waves near the vehicle using at least one radar transmit antenna of at least one radar sensor assembly coupled to the vehicle. Next, receiving the radar waves after reflection from an object in a detection zone using at least one radar receive antenna of the at least one radar sensor assembly. The method continues with the step of outputting a sensor signal corresponding to motion of an object in the detection zone using the at least one radar sensor assembly. The next step of the method is receiving the sensor signal corresponding to the motion of the object from the at least one radar sensor assembly using a data acquisition module of an electronic control unit coupled to the at least one radar sensor assembly. The method proceeds by filtering the sensor signal received using the electronic control unit to filter non-moving objects and extracting a plurality of extracted features of the sensor signal using a plurality of analysis modules of the electronic control unit. The method also includes the step of sending the plurality of extracted features to a neural network of an artificial neural network module of the plurality of analysis modules. The method additionally includes the step of matching the plurality of extracted features of the sensor signal to a plurality of predetermined matching classes using the neural network of the artificial neural network module. Then, classifying the plurality of extracted features of the sensor signal according to the matching of the plurality of extracted features of the sensor signal to the plurality of predetermined matching classes. The method continues with the step of initiating movement of the closure member in response to the plurality of extracted features matching at least one of the plurality predetermined matching classes associated with a valid activation gesture using the electronic control unit.

The radar detection system according to the present disclosure provides numerous benefits, which are especially attractive to a user of the vehicle. Due to the use of radar, the alteration of the vehicle body or trim may not be necessary, since radar is capable of sensing through polymers.

These and other aspects and areas of applicability will become apparent from the description provided herein. The description and specific examples in this summary are intended for purpose of illustration only and are not intended to limit the scope of the present disclosure.

DRAWINGS

Other advantages of the present disclosure will be readily appreciated, as the same becomes better understood by reference to the following detailed description when considered in connection with the accompanying drawings wherein:

FIG. 3 is an enlarged view of a portion of the motor vehicle including the indicator shown in FIG. 2 according to aspects of the disclosure;

FIG. 4 is an enlarged view of a portion of an example bumper assembly of a motor vehicle having a user-activated, non-contact power closure member system constructed in accordance with the teachings of the present disclosure and which includes a graphic illuminated during activation and operation of the system according to aspects of the disclosure;

Figure 15:
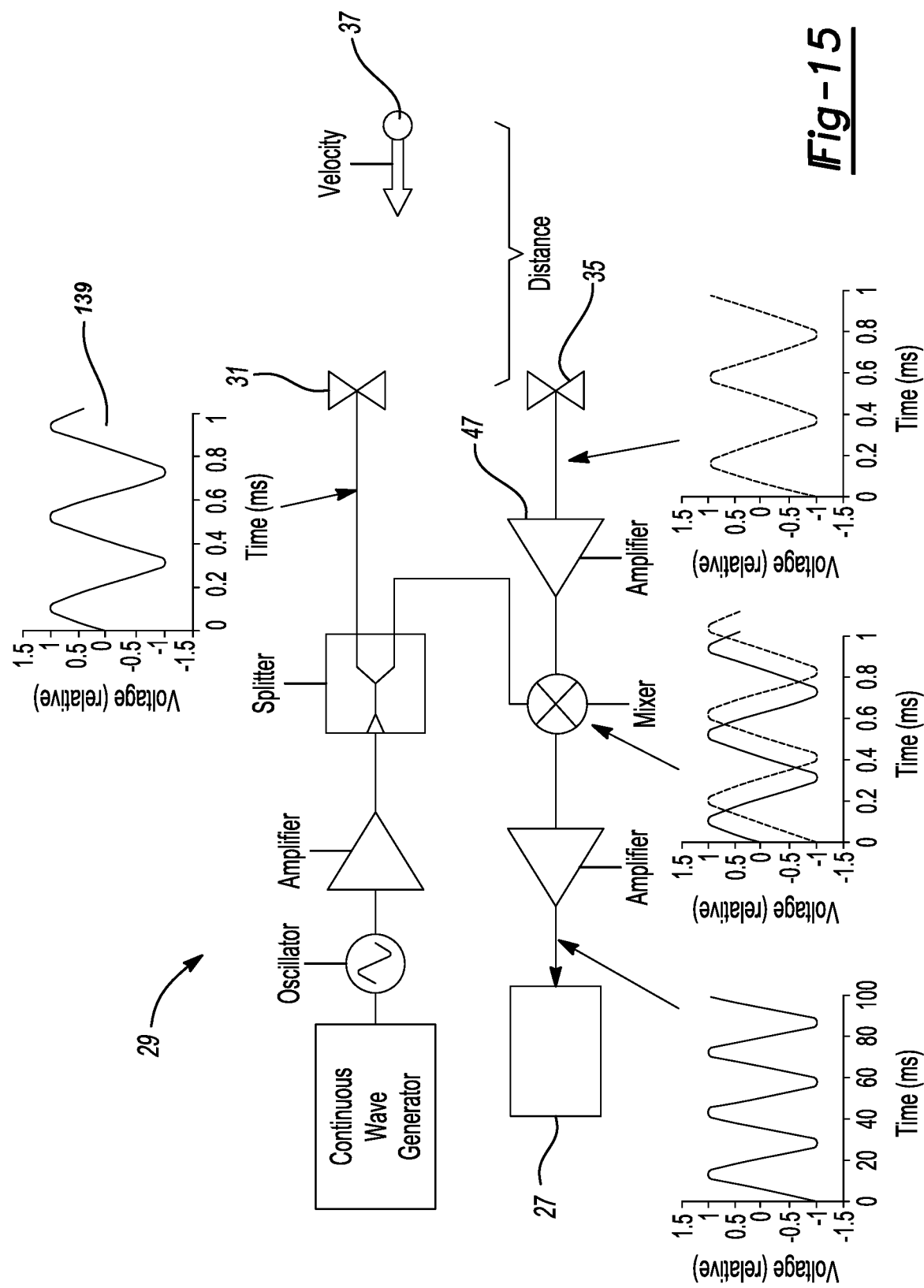
Figure 16:
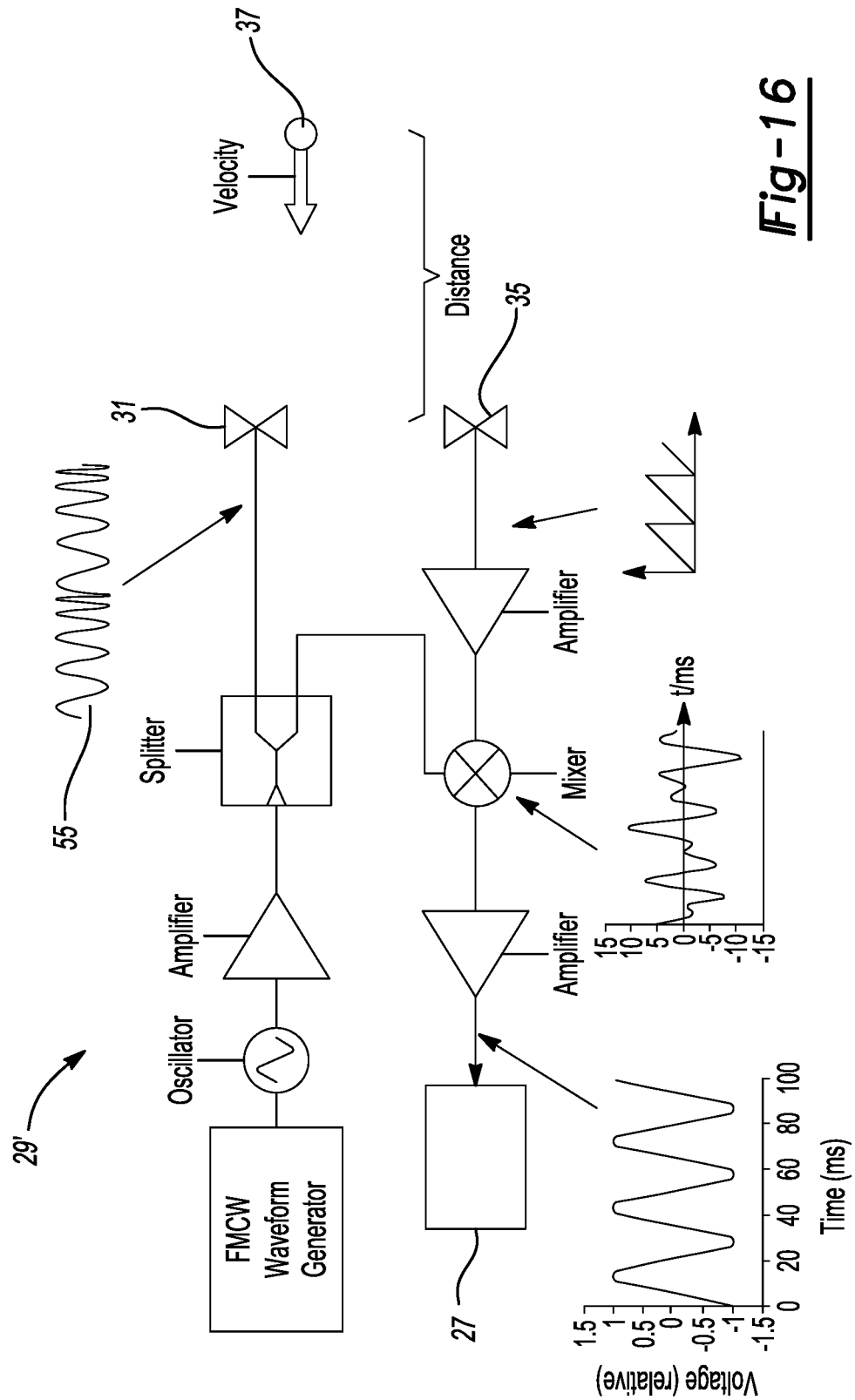
Figure 17:
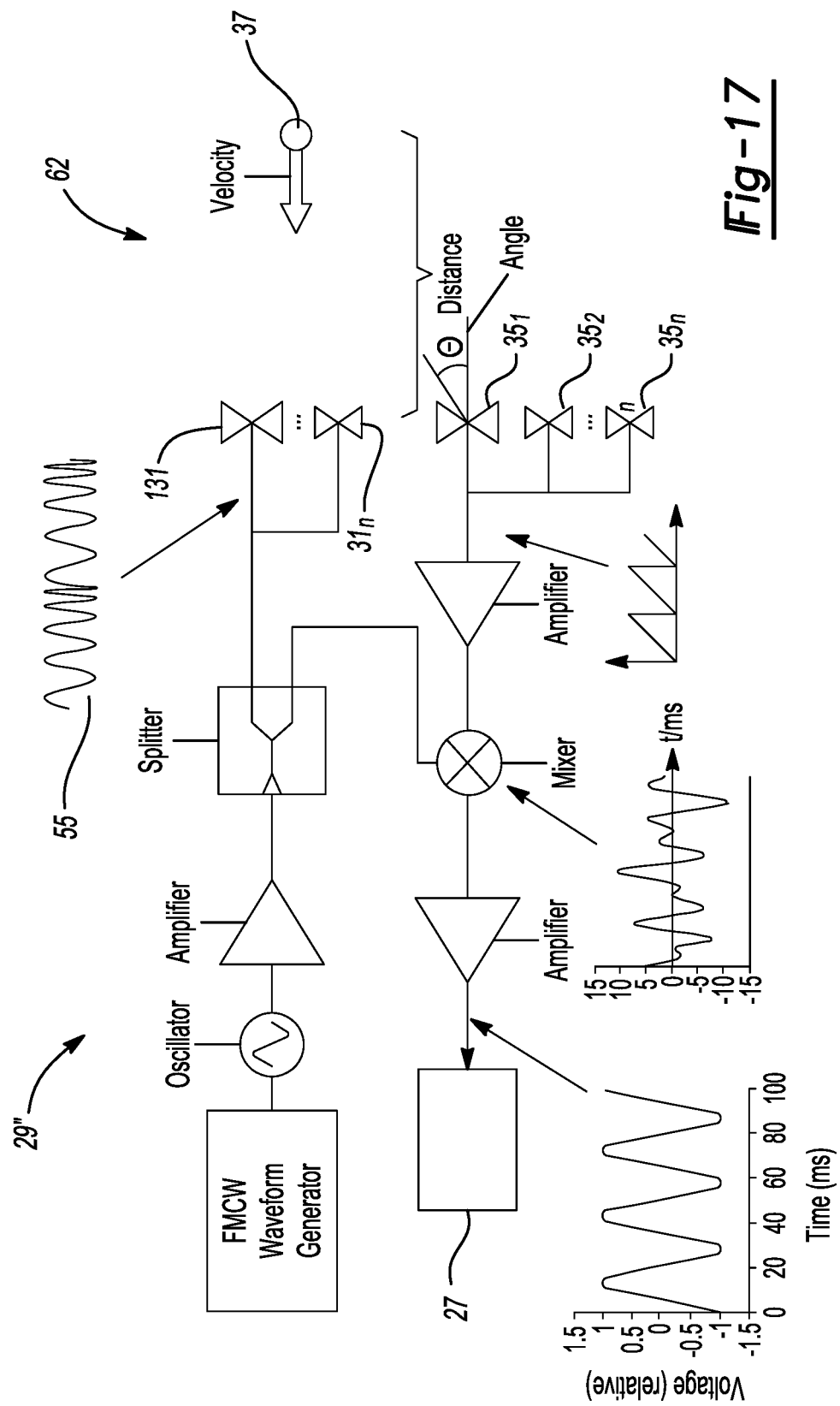
Figure 18:
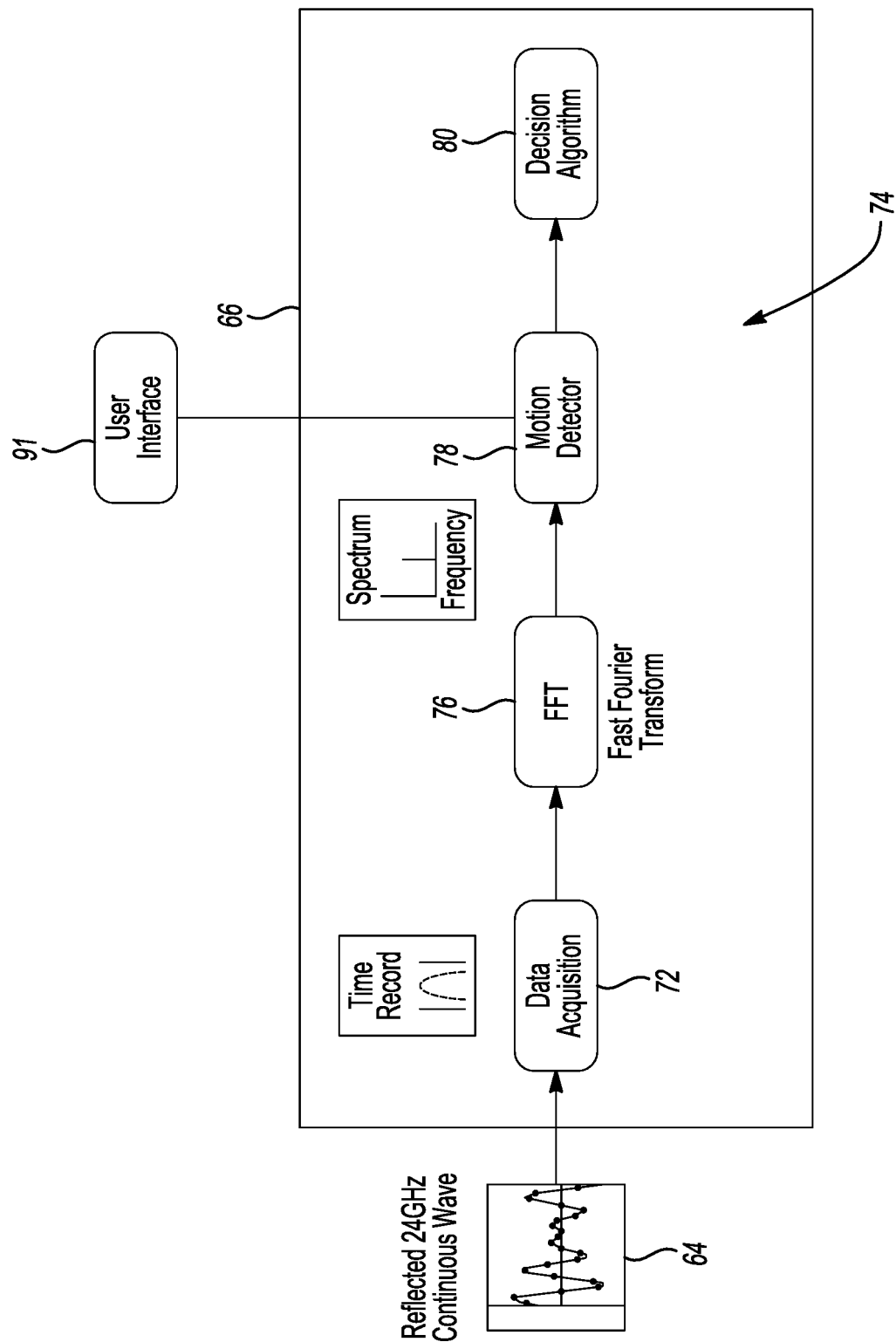
Figure 19:
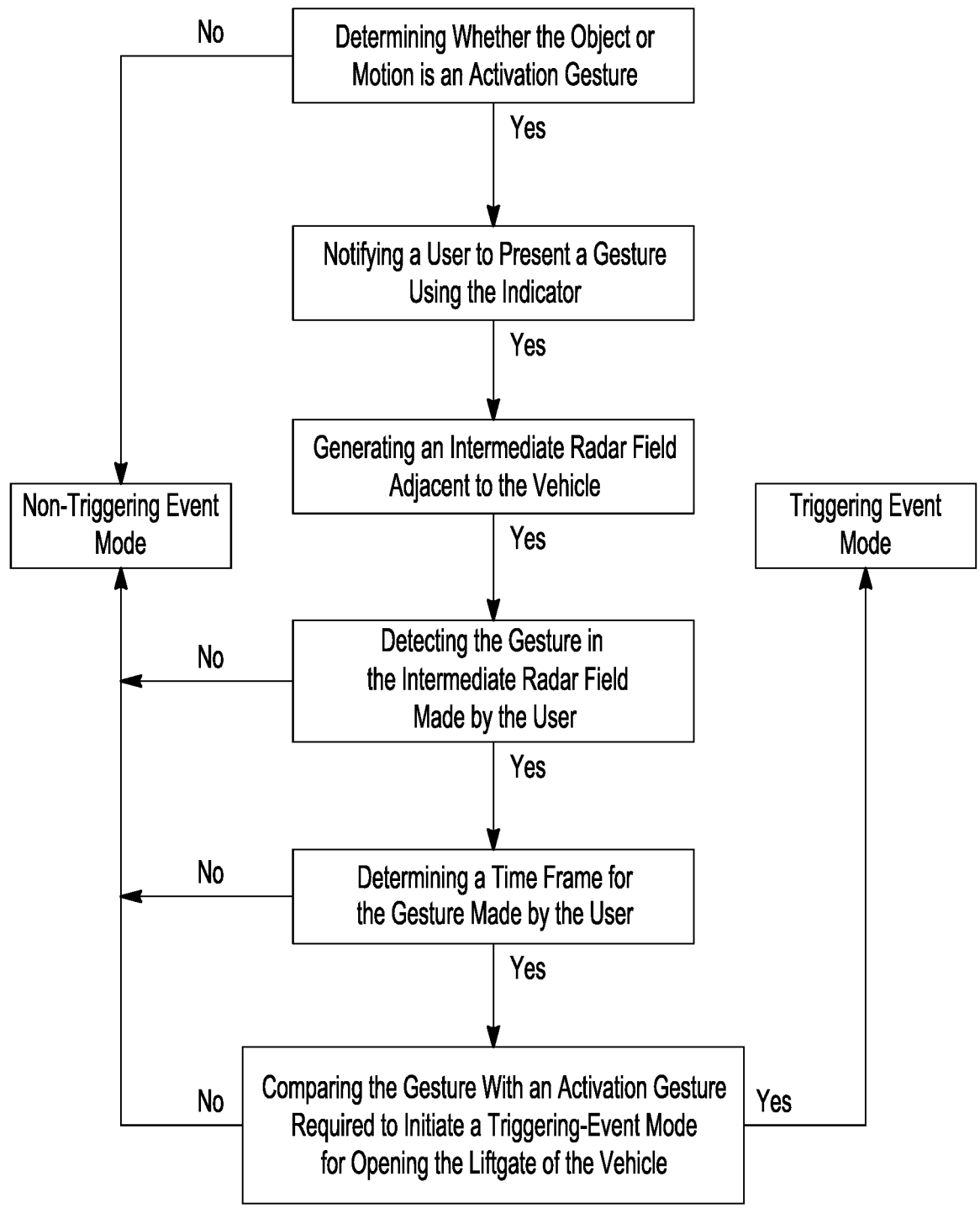
Figure 20:
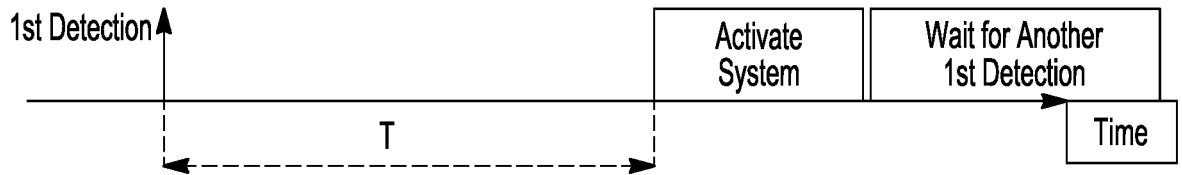
Figure 20:
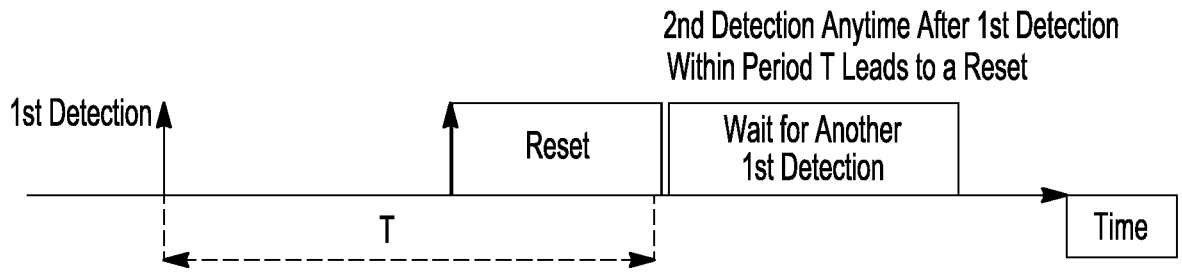
Figure 21:
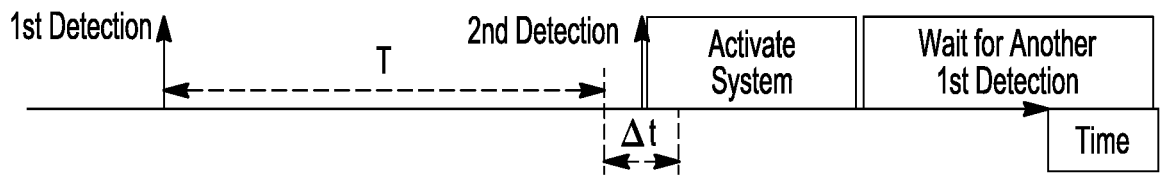
Figure 21:
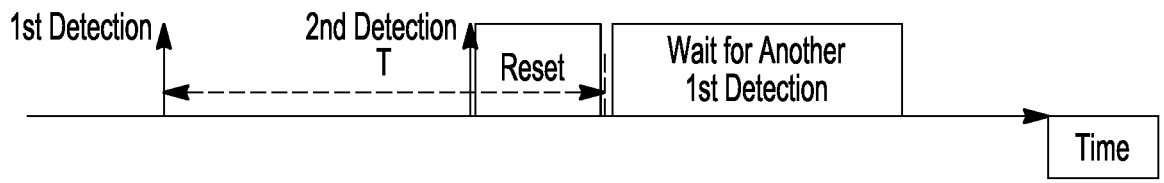
Figure 21:
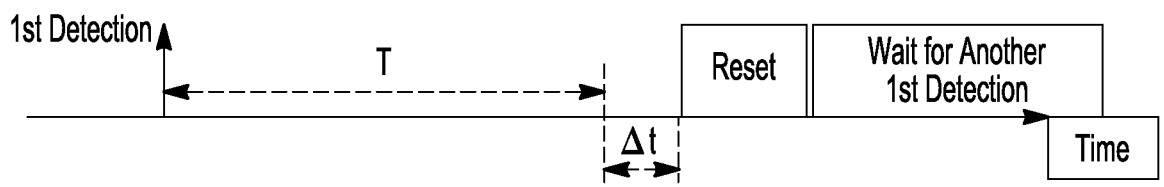
Figure 22:
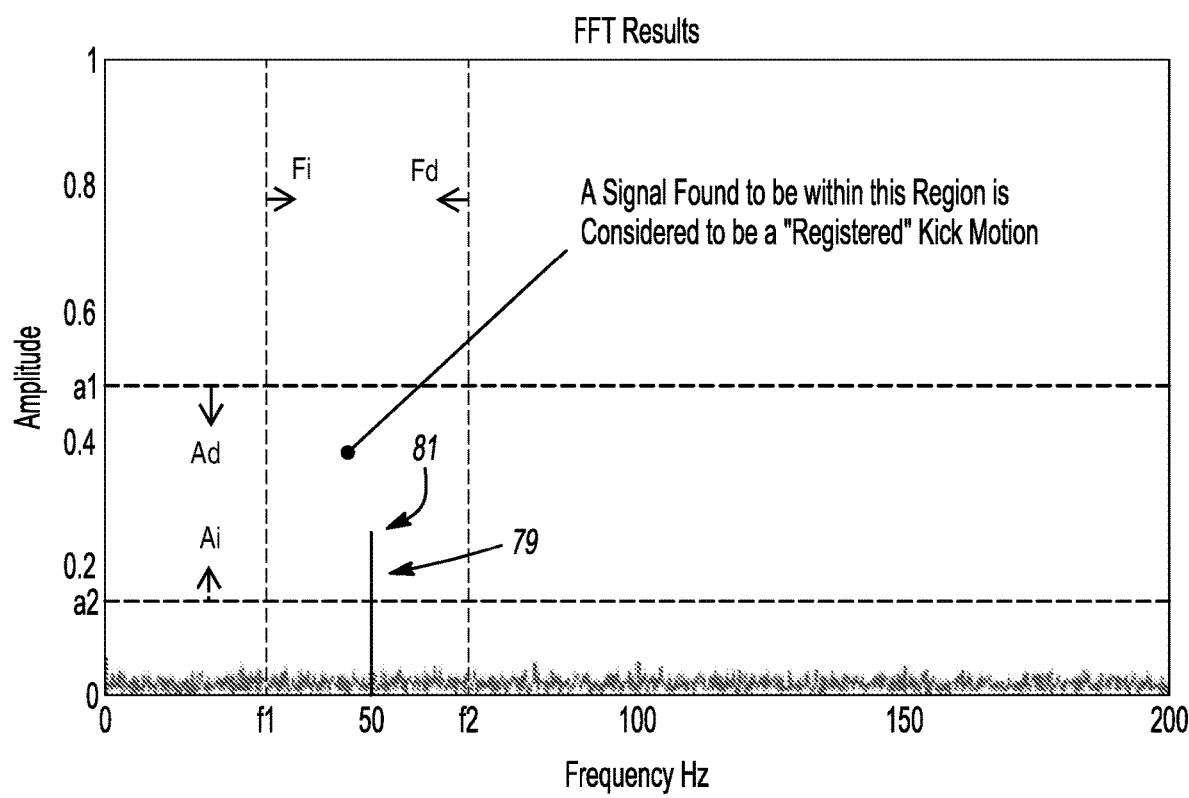
Figure 23:
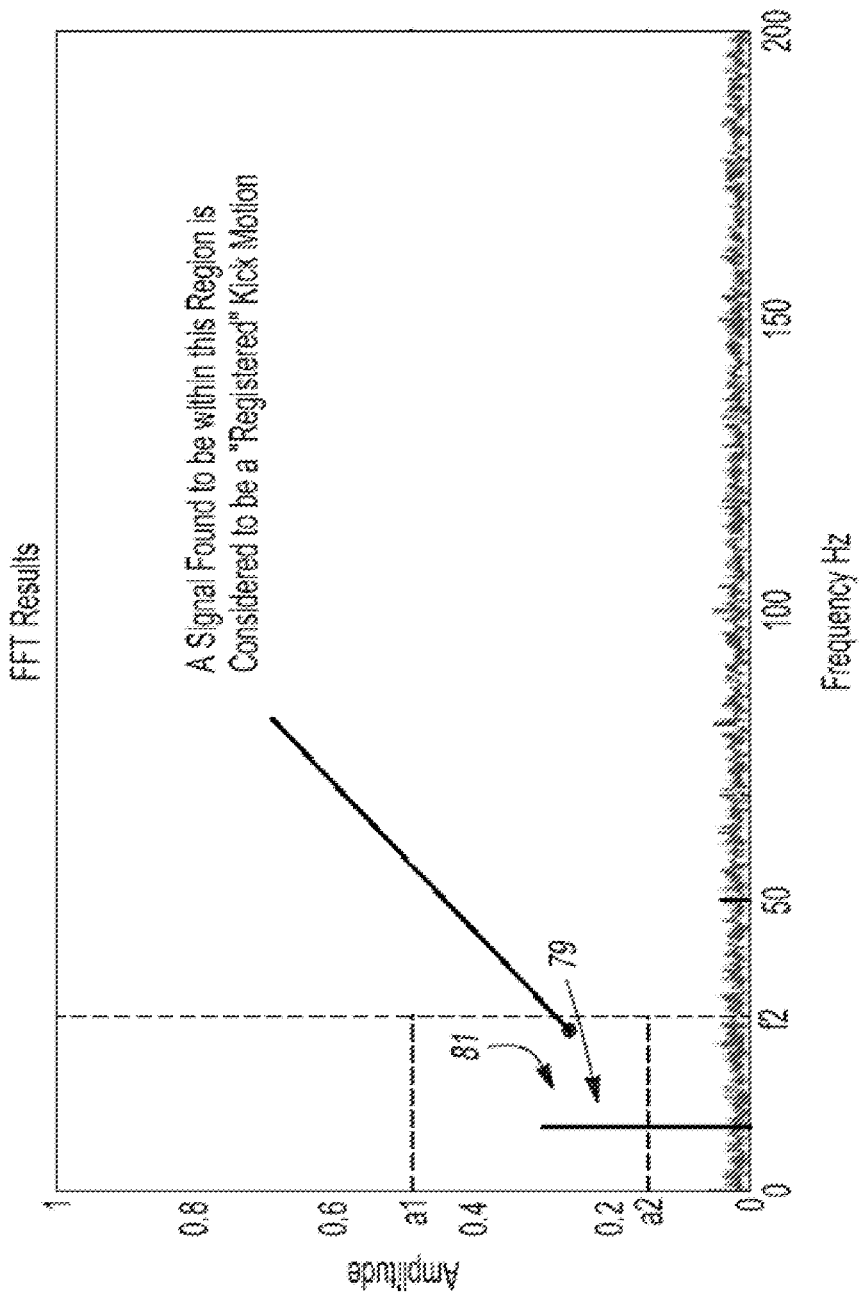
Figure 24:
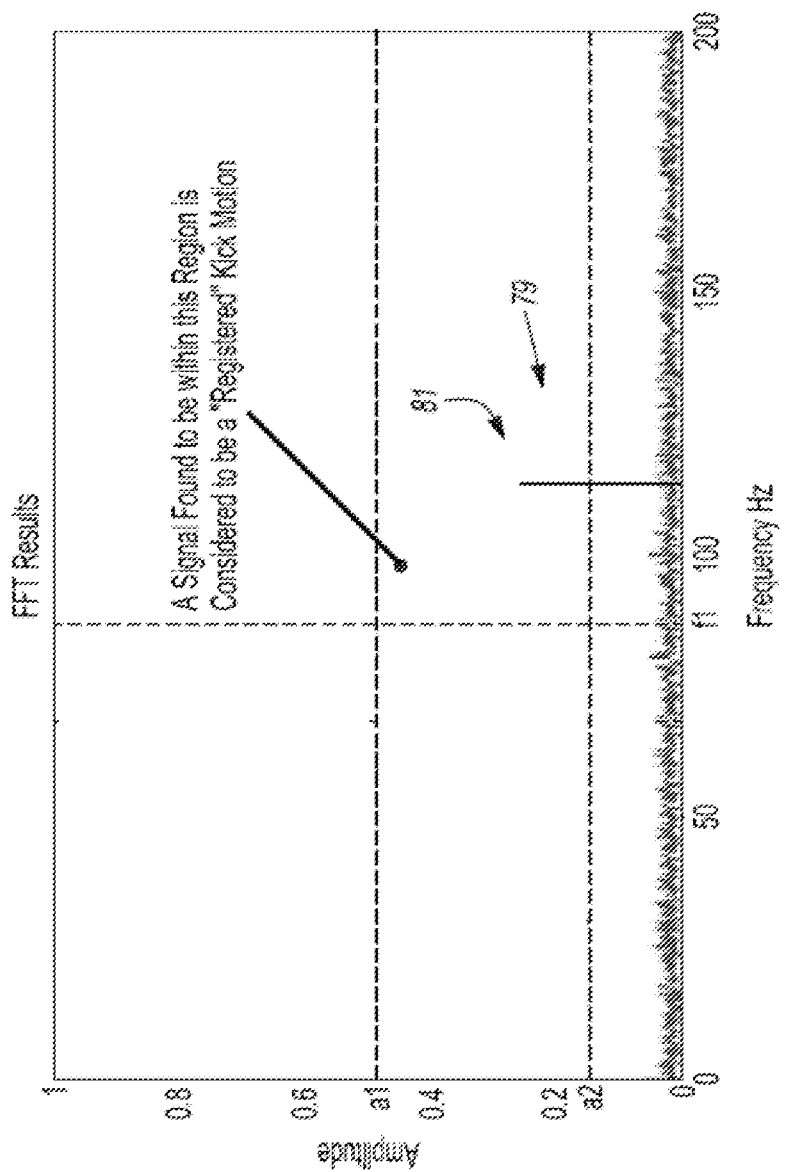
Figure 25:
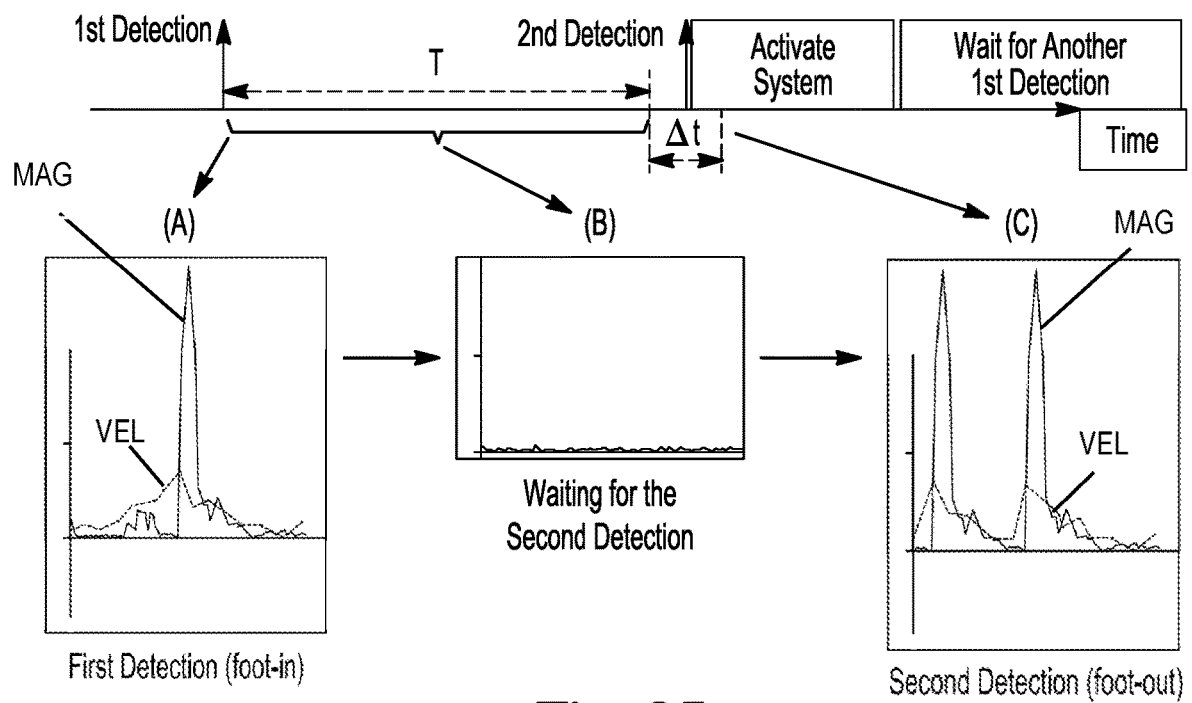
Figure 26:
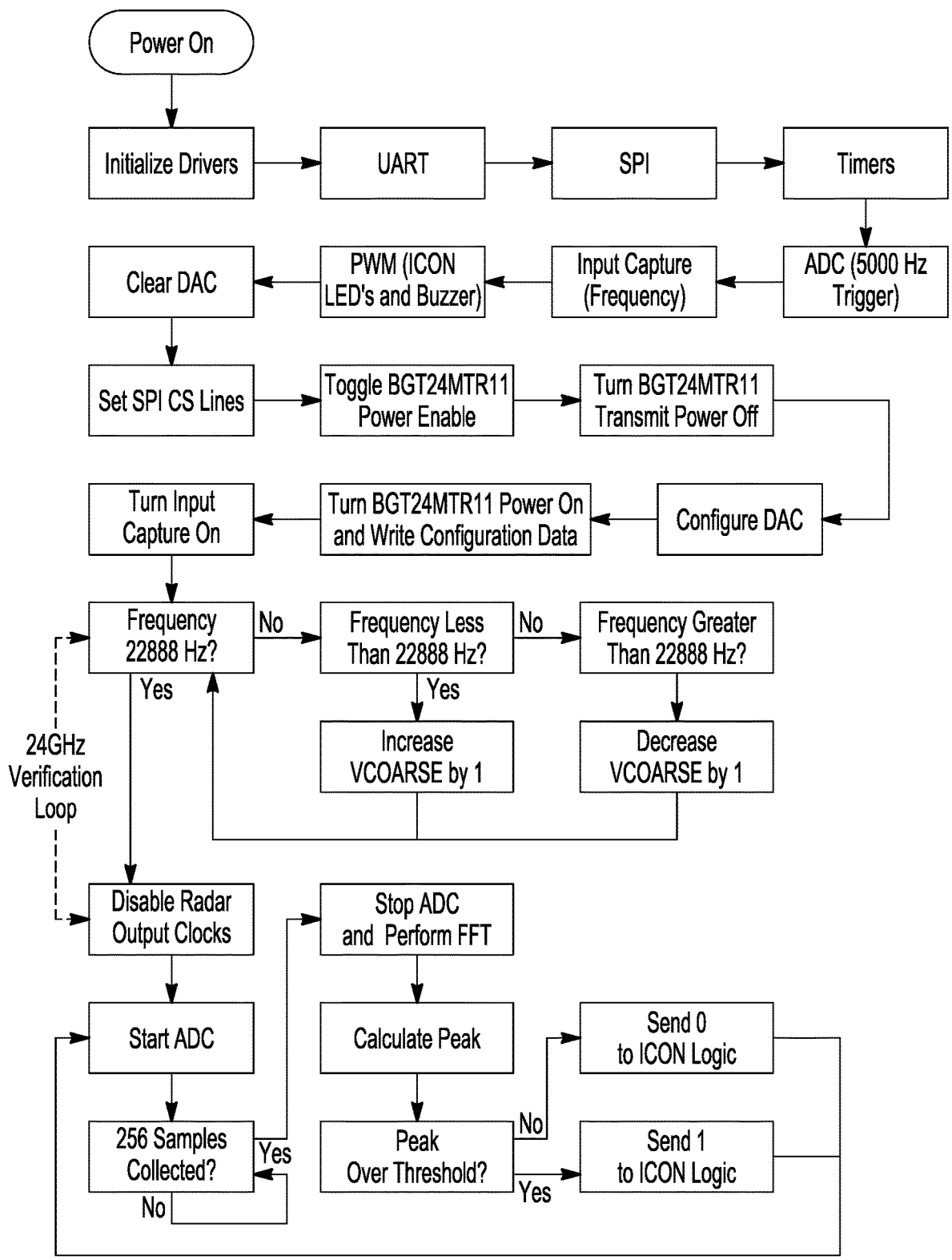
Figure 27:
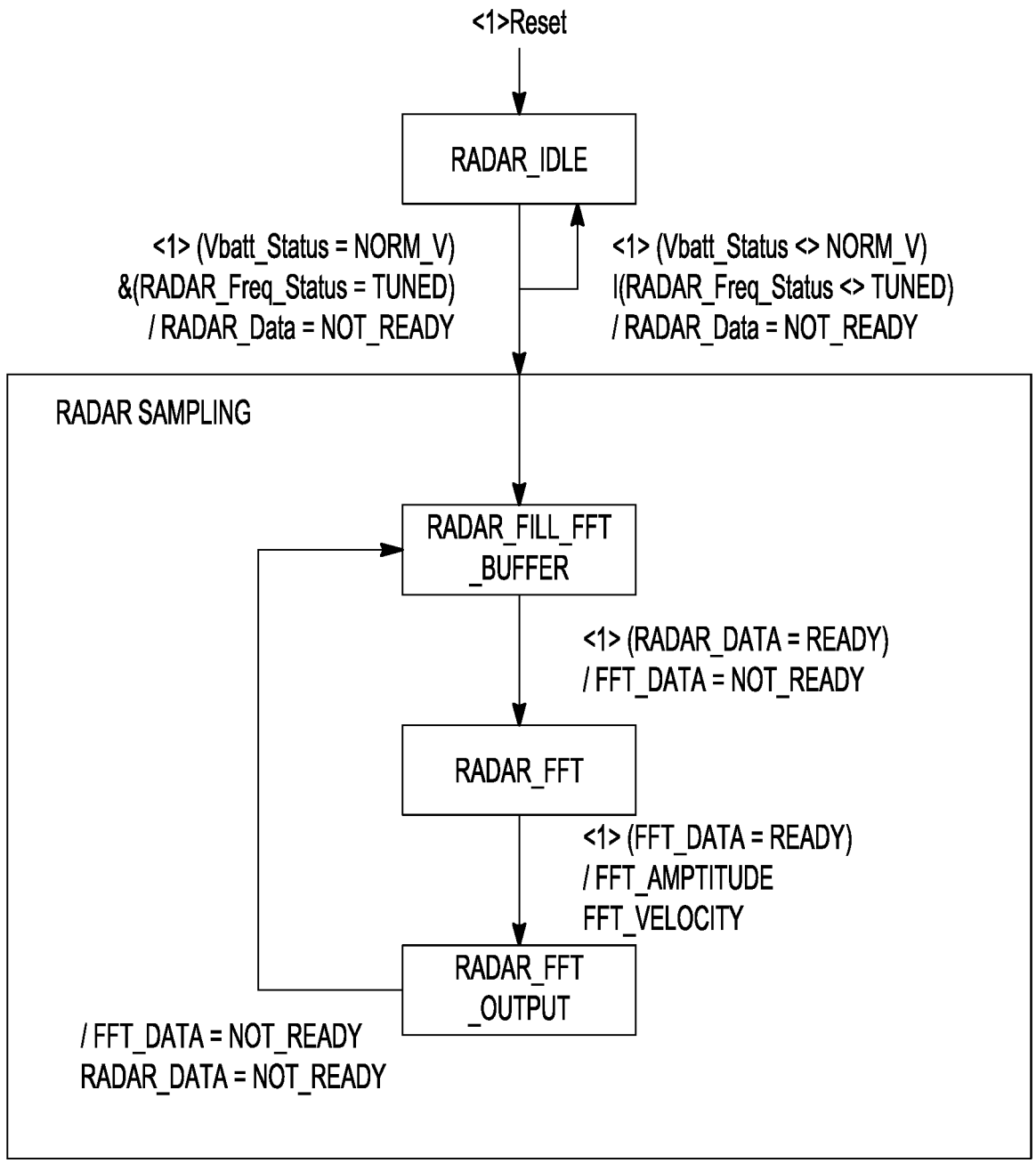
Figure 28:
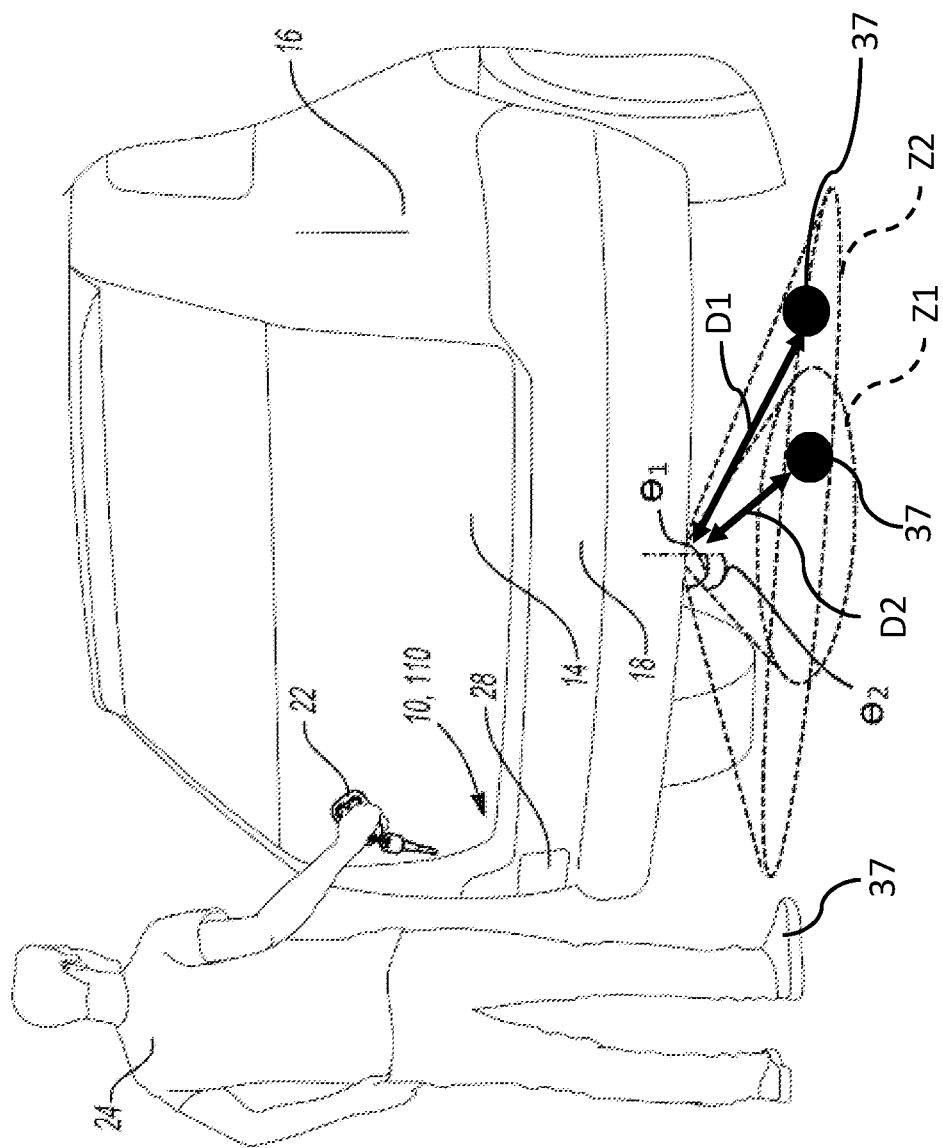
Figure 29:
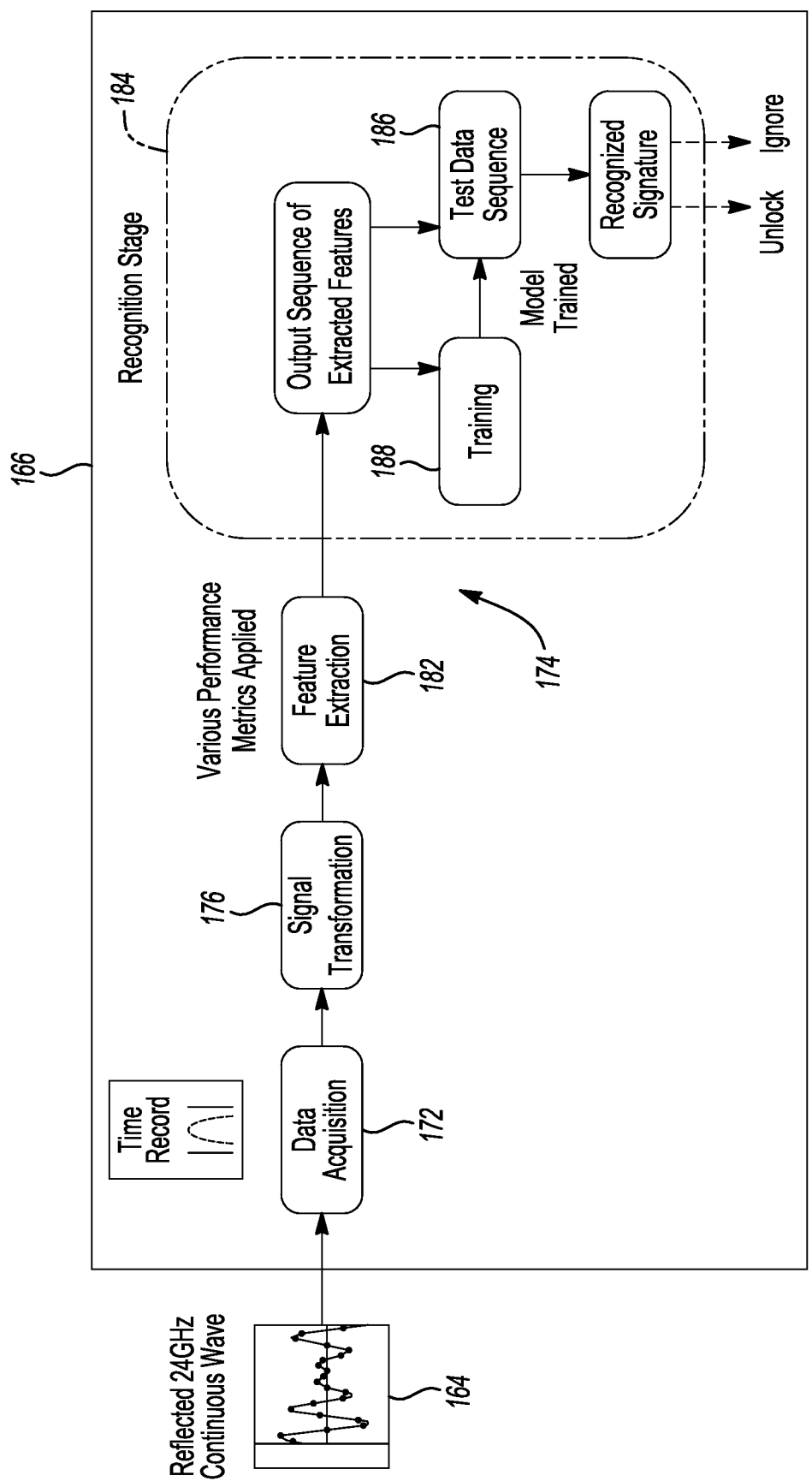
Figure 30:
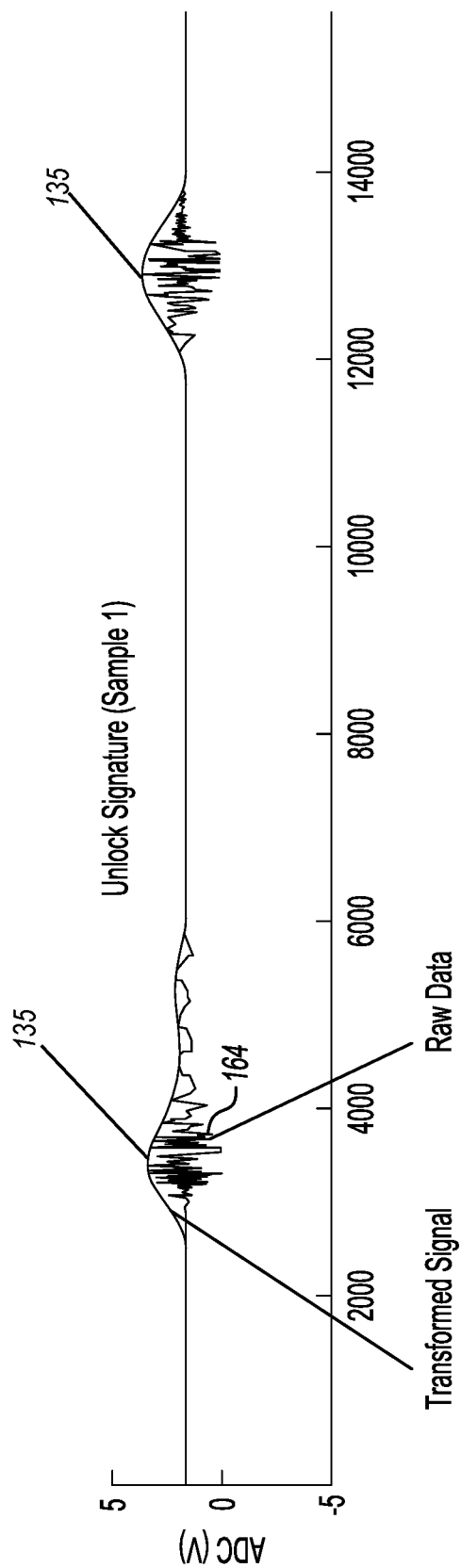
Figure 31:
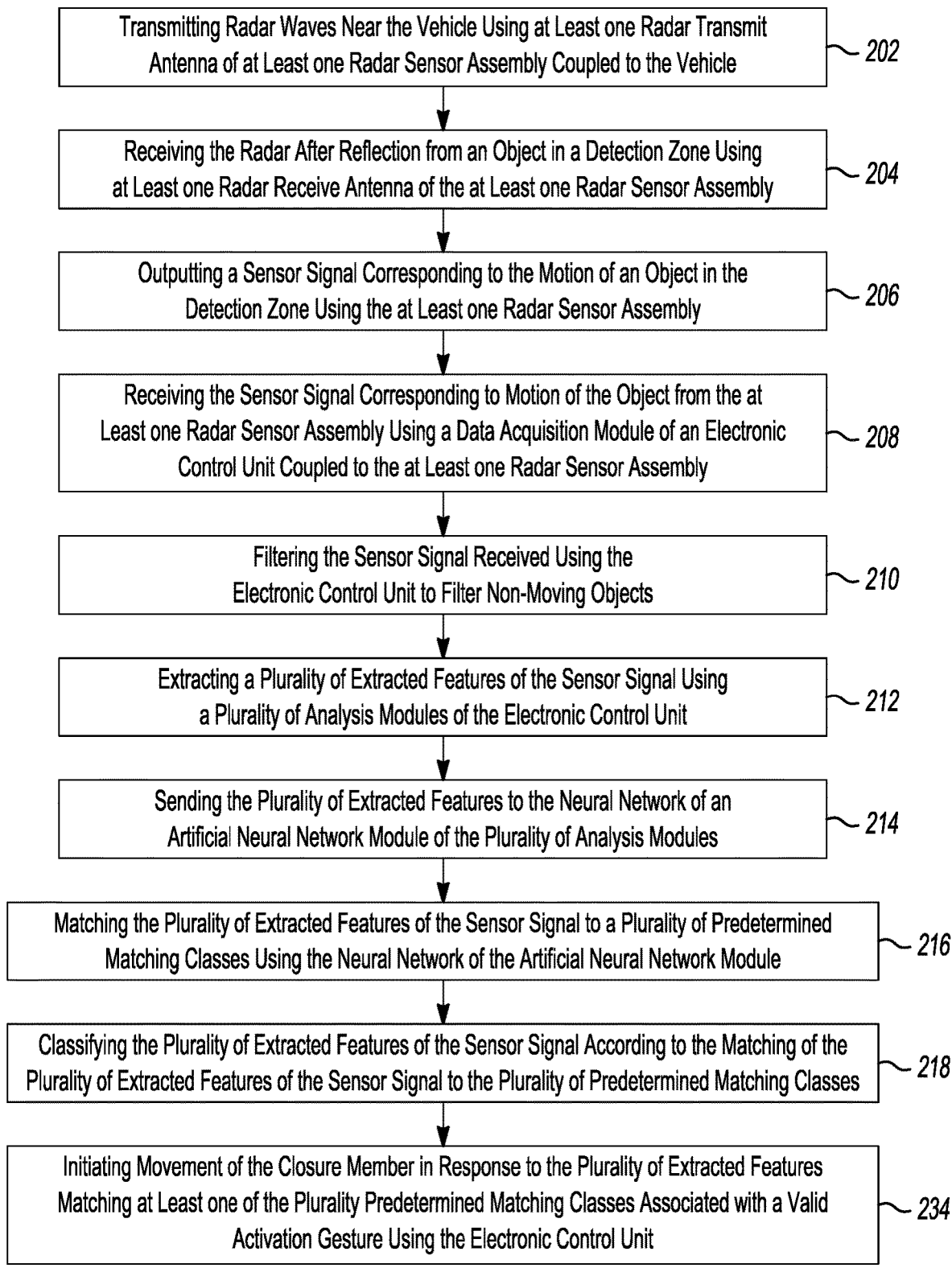
Figure 32A:
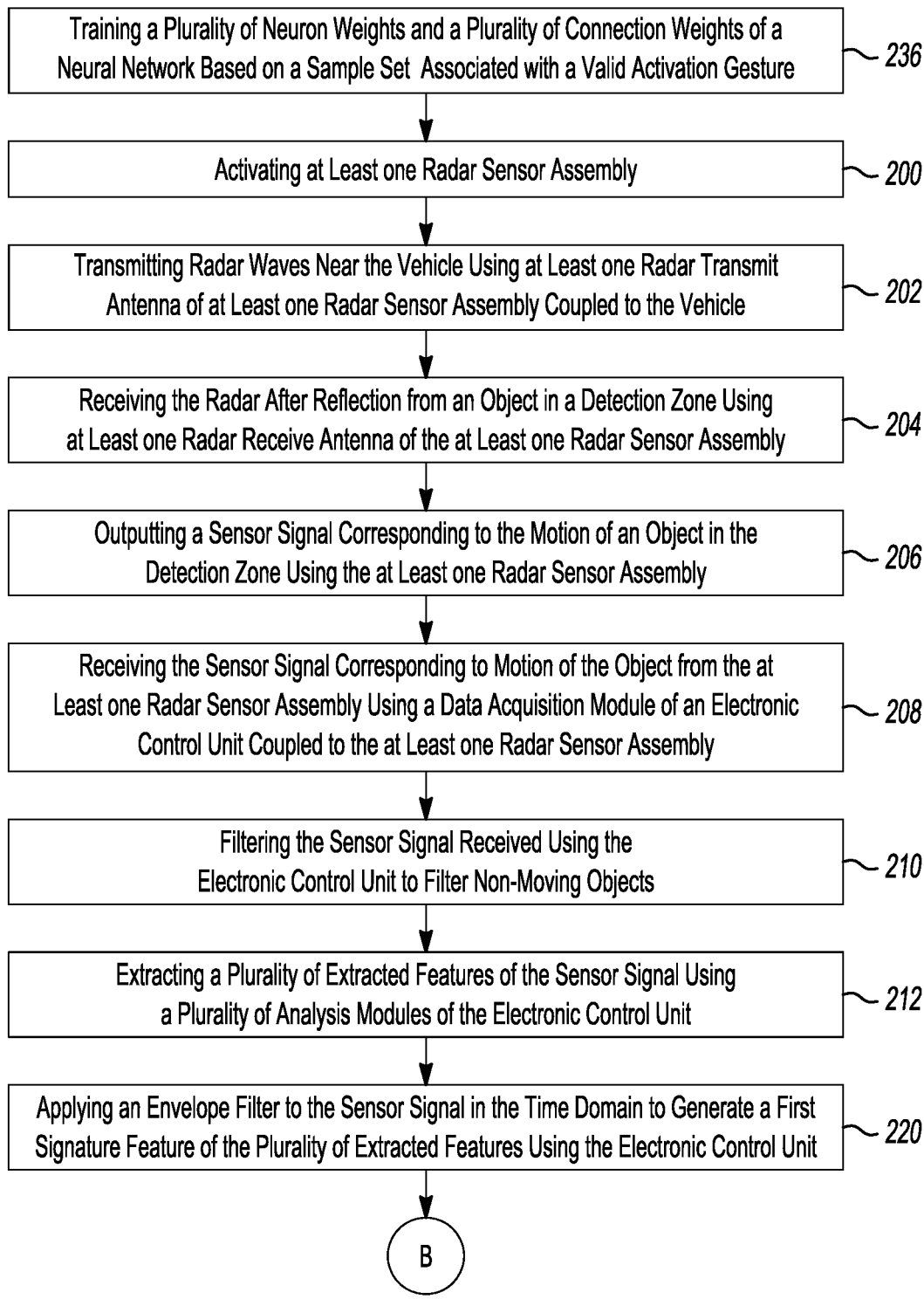
Figure 32B:
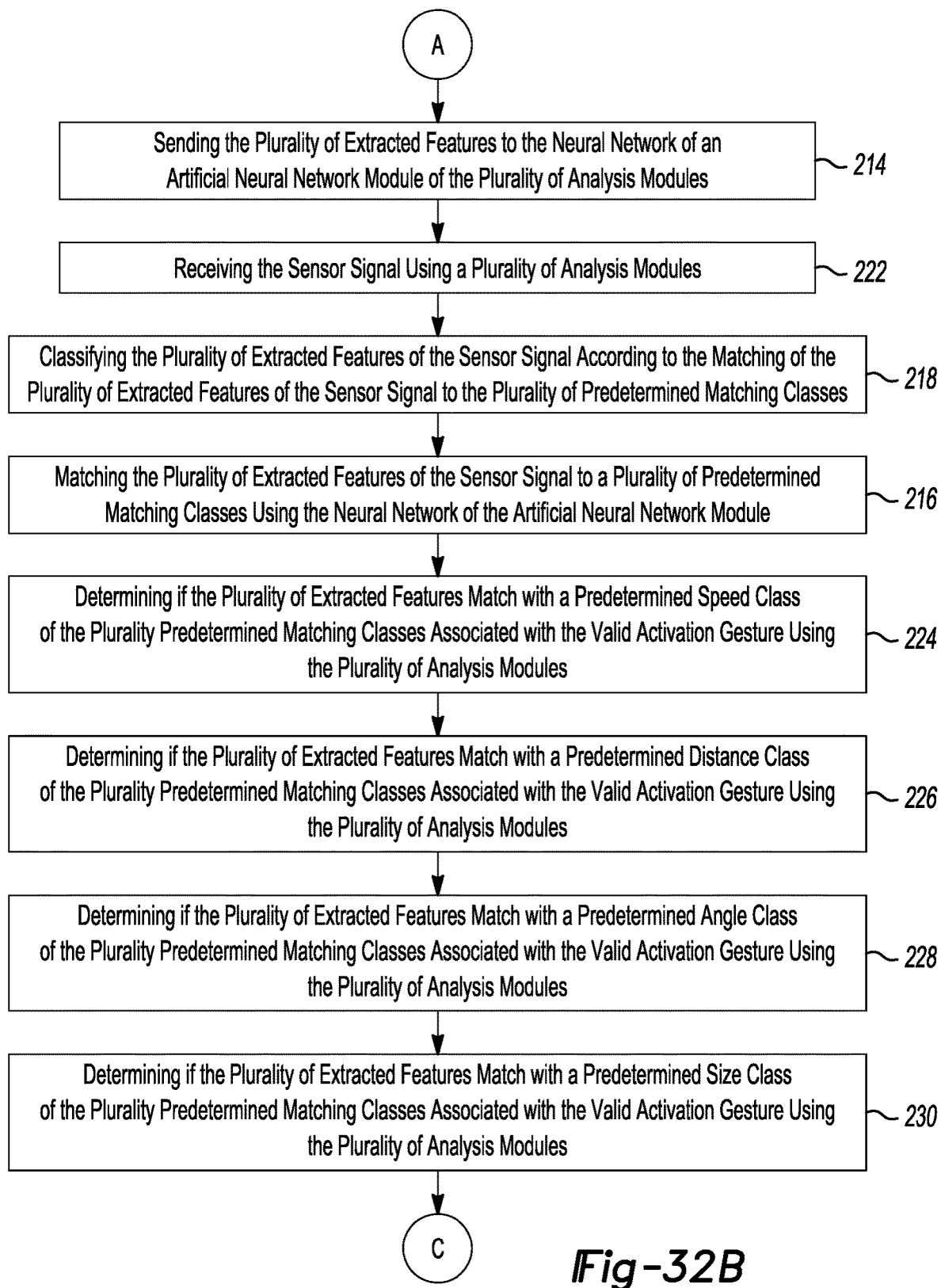
Figure 32C:
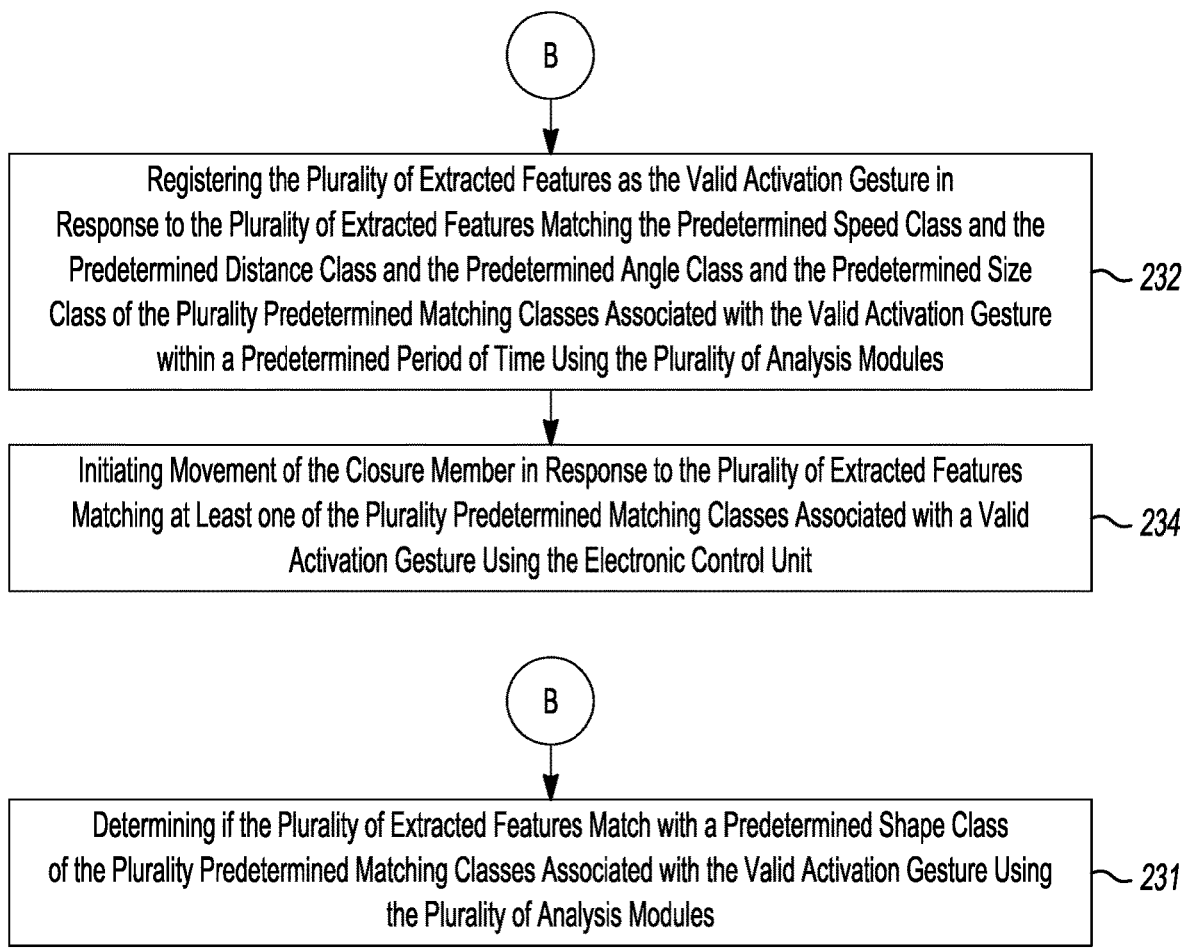

FIGS. 10, 11A-11B, and 12A-12B illustrate additional views of the radar printed circuit board and the lighting printed circuit board according to aspects of the disclosure;

FIGS. 13A-13B and 14A-14B illustrate separate housings for the radar printed circuit board and the lighting printed circuit board according to aspects of the disclosure;

FIG. 15 is a schematic diagram of a continuous wave Doppler based radar sensor, in accordance with an illustrative embodiment;

FIG. 16 is a schematic diagram of a continuous wave frequency modulated radar based sensor, in accordance with an illustrative embodiment;

FIG. 17 is a schematic diagram of a continuous wave frequency modulated radar based sensor, in accordance with an illustrative embodiment;

FIG. 18 is a block diagram of the electronic control unit of a first exemplary embodiment of the radar detection system according to aspects of the disclosure;

FIG. 19 is a flow chart illustrating steps of operating a closure member using the radar detection system according to aspects of the disclosure;

FIGS. 20 and 21 illustrate timing of operation of the radar detection system according to aspects of the disclosure;

FIG. 22 illustrates a peak of the frequency domain representation of a sensor signal of the radar detection system having a peak amplitude at a peak frequency according to aspects of the disclosure;

FIG. 23 illustrates a peak of the frequency domain representation of a sensor signal of the radar detection system having a peak amplitude at a peak frequency according to aspects of the disclosure;

FIG. 24 illustrates a peak of the frequency domain representation of a sensor signal of the radar detection system having a peak amplitude at a peak frequency according to aspects of the disclosure;

FIG. 25 illustrates the timing of a valid activation gesture and corresponding views of the sensor signal according to aspects of the disclosure;

FIG. 26 illustrates a flow chart of the operation of the electronic control unit of the first exemplary embodiment of the radar detection system according to aspects of the disclosure;

FIG. 27 illustrates an example radar operation flow chart according to aspects of the disclosure;

FIG. 28 illustrates example gesture detection zones according to aspects of the disclosure;

FIG. 29 is a block diagram of the electronic control unit of a second exemplary embodiment of the radar detection system according to aspects of the disclosure;

FIG. 30 illustrates a plot of the sensor signal with an envelope filter applied according to aspects of the disclosure; and FIGS. 31 and 32A-32C are flow charts illustrating steps of a method of operating a radar detection system for user-activated, non-contact operation of a closure member coupled to a vehicle body of a vehicle in accordance with the teachings of the present disclosure.

DETAILED DESCRIPTION

In the following description, details are set forth to provide an understanding of the present disclosure. In some instances, certain circuits, structures and techniques have not been described or shown in detail in order not to obscure the disclosure.

In general, at least one example embodiment of a motion detection system 10, 110 for user-activated, non-contact activation of a powered closure member of a vehicle 12 for moving a closure member (e.g., liftgate 14) relative to a vehicle body 16 between a closed position and an open position constructed in accordance with the teachings of the present disclosure will now be disclosed. A method of operating a motion detection system 10, 110 for user-activated, non-contact activation to operate the closure member coupled to the vehicle body 16 of the vehicle 12 will also be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail. Also, the system 10, 110 could alternatively be used to open and/or close another closure member of a vehicle 12, such as, but not limited to a sliding door or power swing door of the vehicle 12.

Referring initially to FIGS. 1-4, an example motor vehicle 12 is shown to include the closure member being the rear liftgate 14 mounted to the vehicle body 16. According to a first exemplary embodiment of the motion detection system 10, a radar detection system 10 described in the present disclosure, the radar detection system 10 is integrated into a rear bumper 18 of the vehicle body 16 and used for controlling movement of the rear liftgate 14. However, the radar detection system 10 could be placed at another location such near a door handle, on the interior surface of the rear bumper 18 for example, and used for the rear liftgate 14 or used for a different closure member. It is recognized that the motion detection system 10 and related methods described herein may employ other types of electromagnetic radiation of different electromagnetic spectrums. The radar detection system 10 includes at least one radar sensor assembly 20 which senses an object or motion when a key fob 22 associated with the specific vehicle 12 is located within a predetermined distance of the vehicle 12, for example when the key fob 22 is in possession of a user 24 approaching the vehicle 12. The at least one radar sensor assembly 20 can transmit and sense Continuous Wave (CW) radar, Frequency-Modulated Continuous-Wave (FMCW) radar; however, other types of radar can alternatively be used, continuous, pulsed or otherwise. Although the key fob 22 is used in the example embodiment, another component associated with the specific vehicle 12 and which can be detected by the vehicle 12 could be used or it may be possible to otherwise initialize the system 10 without using the key fob 22. An example of the object detected by the at least one radar sensor assembly 20 is a foot of the user 24, and an example of the motion detected by the at least one radar sensor assembly 20 is a kicking or waving motion of the user 24. Another example may be a motion detection followed by a non-waving, stationary motion detection, for example representing a step into the detection zone 62, and vice-versa. It should be appreciated that other objects and/or motions, and combinations thereof may be alternatively utilized.

As shown in FIGS. 4-7, the first exemplary embodiment of the radar detection system 10 also may include an indicator 28 located on the vehicle 12 to inform the user 24 of the appropriate location to make an activation gesture which initiates opening of the closure member (e.g., liftgate 14). The activation gesture could be a movement made by the user 24, and/or or an object placed by the user 24 adjacent the at least one radar sensor assembly 20. In the example embodiments, the indicator 28 is located adjacent the at least one radar sensor assembly 20, for example on the rear bumper 18 of the vehicle 12. The indicator 28 can also inform the user 24 if the system 10 is activated or powered up, during system 10 wake-up, in motion, has detected the user 24 approaching the vehicle 12, that the system 10 is receiving input from the user 24, and/or if the system 10 is waiting for the activation gesture. The indicator 28 of the example embodiment includes a graphic 30, also referred to as an icon, for example a lighted or backlighted picture of an open liftgate 14, to alert the user 24. The use of the indicator 28 provides the user 24 with a visual indication of where the at least one radar sensor assembly 20 is located. This feature is beneficial to the user 24 and provides an advantage over comparative systems, which require the user 24 to guess where a sensor and/or the sensing zone of the sensor is located below a rear bumper 18. Nevertheless, it should be understood that the radar detection system 10 disclosed herein may not include an indicator 28 and the at least one radar sensor assembly 20 may be hidden (e.g., behind the bumper or trim), because the at least one radar sensor assembly 20 is capable of sensing through polymers. Alternatively, the radar detection system 10 could be mounted in a plastic housing on the exterior of the rear bumper 18, in such a case, the radar could still penetrate through the plastic housing.

An audible warning tone, honk, or beep can also be used, with or without the graphic 30, to alert the user 24. The indicator 28 can also include other features or components to notify the user 24, for example another type of light or lighted area along or near the rear bumper 18, tail lights, reverse lights, signal lights, an object or projection on a glass of the vehicle 12, for example a projected image or light. According to one example embodiment, the indicator 28 has a different color in the ON and OFF state and provides the user 24 with an idea of where to place his or her foot. Additionally, the indicator 28 used to notify the user 24 may be located in any other area on the vehicle 12 that could be visible to the user 24. In summary, various options are possible for the feature or features used as an indicator 28 to notify the user 24. The key point is that feedback is provided to the user 24 for foot detection. Thus, in an example embodiment, when the rear liftgate 14 is about to open or opening, the indicator 28, for example the lighted graphic 30 and audible tone, can be activated to notify the user 24.

Figure 5:
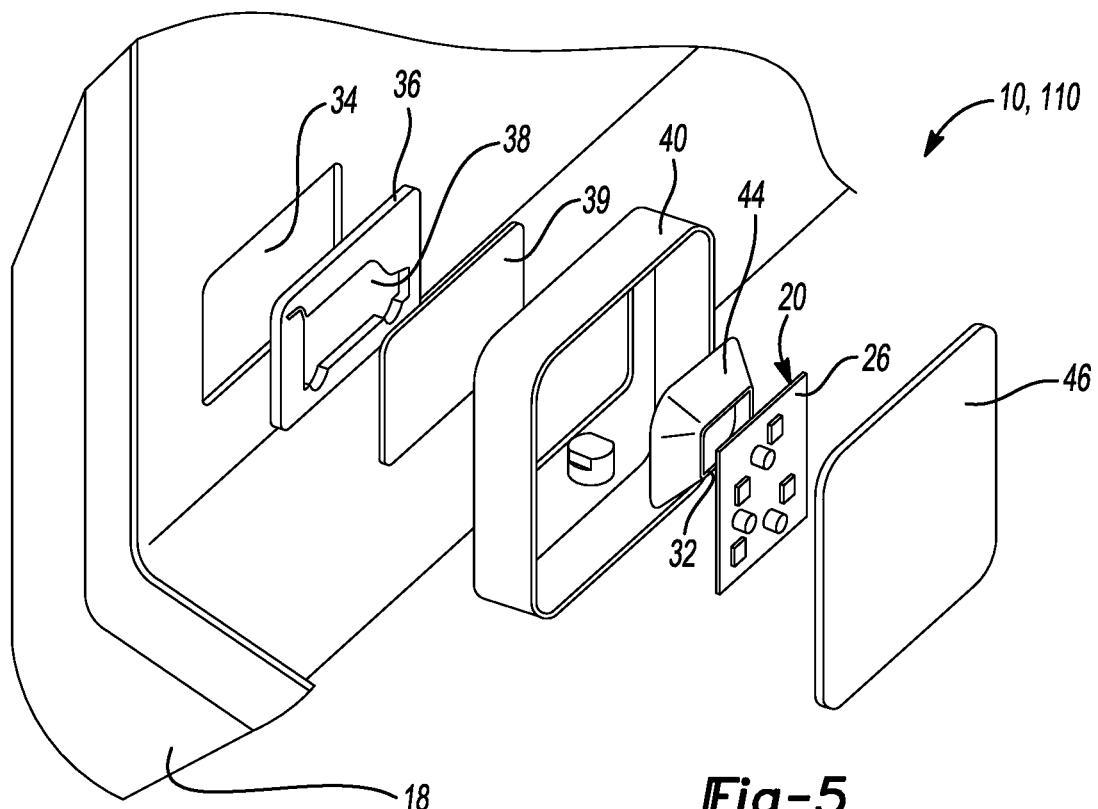
FIG. 5 is an exploded view of an example radar detection system including a single radar sensor assembly which is mounted on a rear bumper and constructed in accordance with the teachings of the present disclosure.
Figure 6:
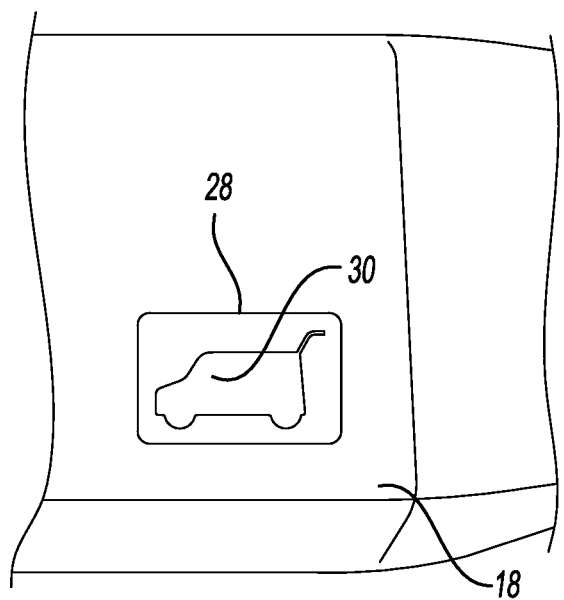
FIG. 6 is an exterior view of the example radar detection system shown in FIG. 5 according to aspects of the disclosure.
Figure 7:
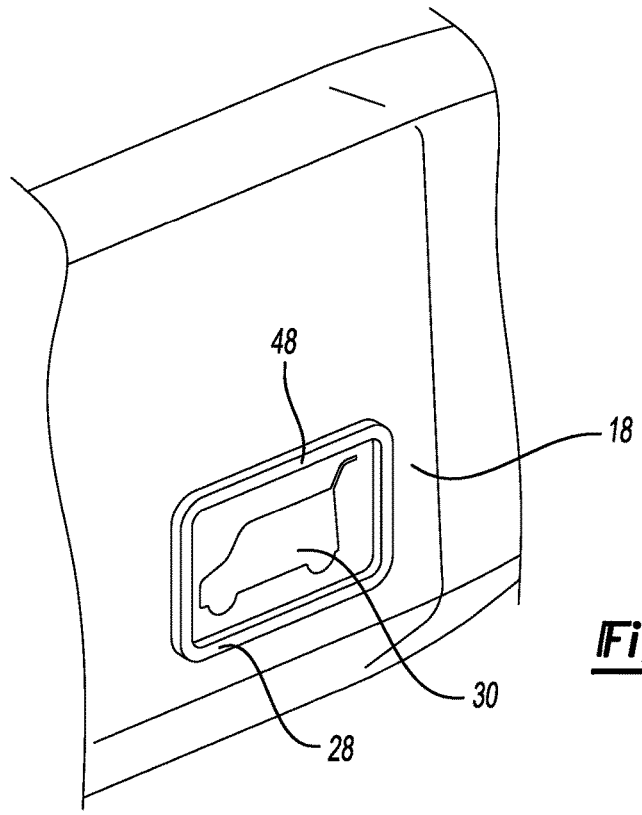
FIG. 7 illustrates an example optional trim bezel which can be installed around a graphic of a radar detection system constructed in accordance with the teachings of the present disclosure to cover manufacturing defects and/or misalignments according to aspects of the disclosure.

An exploded view of the first exemplary embodiment of the radar detection system 10 with the at least one radar sensor assembly 20 is shown in FIG. 5. The rear bumper 18 can include an opening 34 for various components of the at least one radar sensor assembly 20. An image cover 36 is disposed over the opening 34 which includes a cutout 38 of the graphic 30, in this case the vehicle 12 with the open liftgate 14. The image cover 36 is also painted to match the color of the vehicle body 16. An image diffuser 39, for example a translucent white plastic, is disposed over the image cover 36. Next, a housing 40 is disposed over the image diffuser 39. The at least one radar sensor assembly 20 is contained in the housing 40 and rests on a base wall of the housing 40. A reflector 44 which directs light to the image or area of the graphic 30 is also disposed in the housing 40 adjacent the at least one radar sensor assembly 20. A cover 46 is disposed over the housing 40. The at least one radar sensor assembly 20 includes a radar printed circuit board 26 that is also disposed in the housing 40. In the example embodiment shown in FIG. 5, at least one light emitting diode 32 (LED) is located on the far side of the radar printed circuit board 26. As shown in FIG. 6, which is an exterior view of the system 10 of FIG. 5, the graphic 30 is visible through the image cover 36. As shown in FIG. 7, the system 10 optionally includes a bezel 48 installed from the exterior of the rear bumper 18 to cover 46 any manufacturing defects and/or misalignments that may be present.

Figure 8:
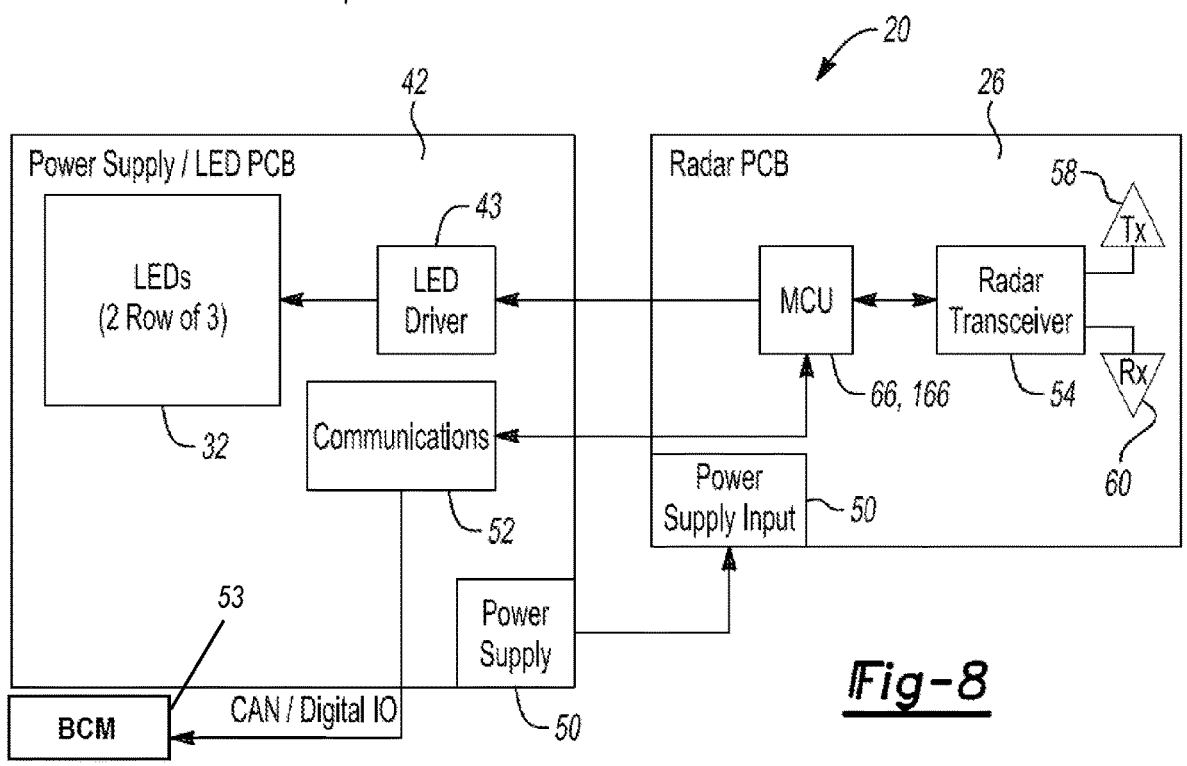
FIG. 8 is block diagram of the radar sensor assembly of the radar detection system illustrating a radar printed circuit board and a lighting printed circuit board according to aspects of the disclosure.
Figure 9:
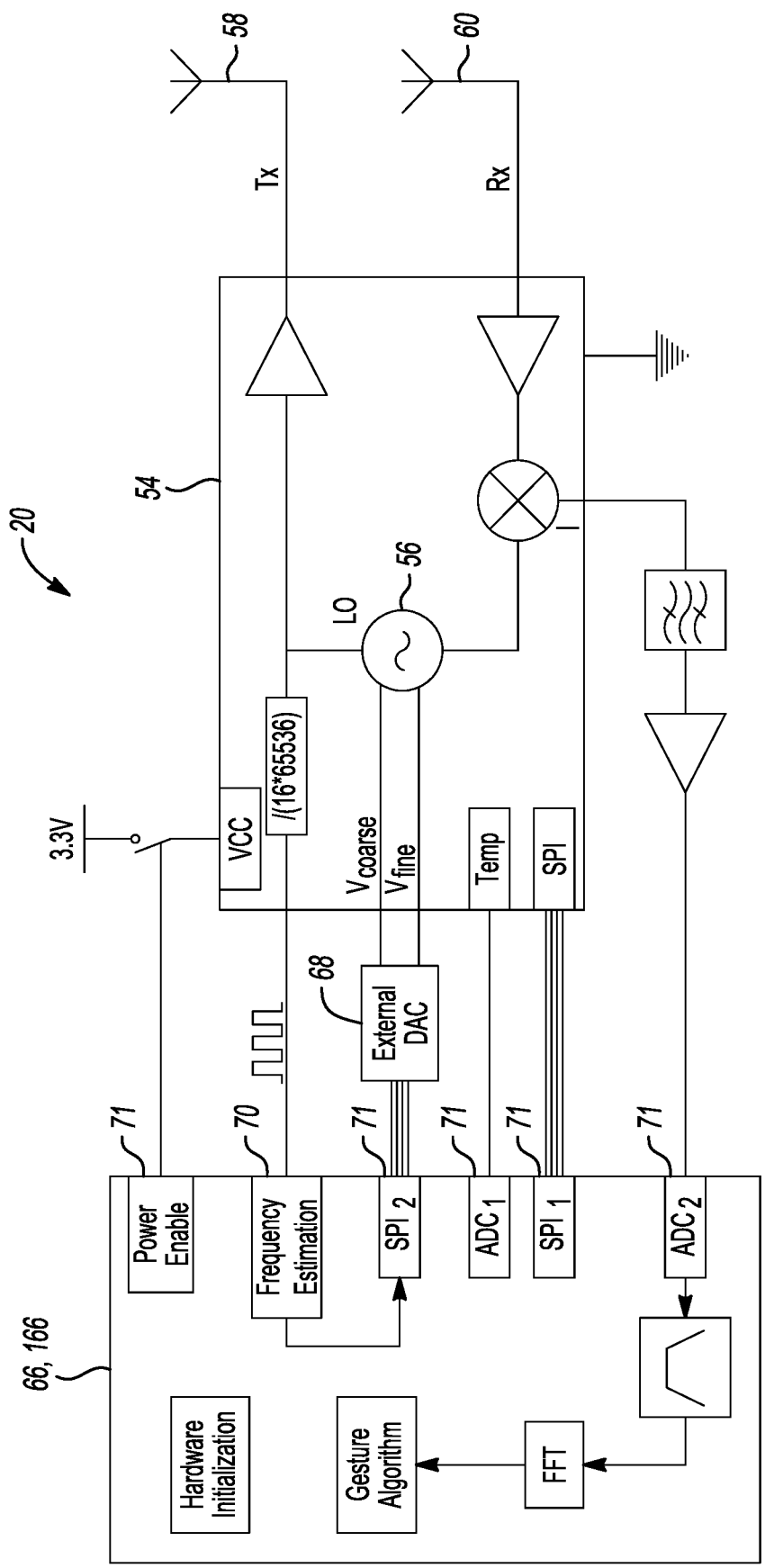
FIG. 9 is block diagram of the radar sensor assembly of the radar detection system including a radar transceiver coupled to an electronic control unit according to aspects of the disclosure.

Although only the radar printed circuit board 26 is shown in FIG. 5, the at least one radar sensor assembly 20 can include a lighting printed circuit board 42 (see FIG. 8) in addition to the radar printed circuit board 26 and on which the at least one light emitting diode 32 (LED) is located and controlled by an LED driver 43, as best shown in FIG. 8. The radar printed circuit board 26 and lighting printed circuit board 42 can include power supply circuitry 50 and a communication module 52 may be included on the lighting printed circuit board 42 to provide communication with a vehicle 12 communication bus (e.g., controller area network/CAN), which may be in communication with a Body Control Module 53 of the vehicle 12, the Body Control Module (BCM) being responsible and configured for monitoring and controlling various electronic accessories and systems of the vehicle 12, such as wireless access systems and devices (e.g. FOB, or PKE based systems) and authentication systems, powered closures system, motors, and control other vehicle systems. Alternatively, communication module 52 may be provided on the radar printed circuit board 26 which may be in communication with the Body Control Module 53 of the vehicle. Also, as best shown in FIGS. 8 and 9, the at least one radar sensor assembly 20 can include a radar transceiver 54 (e.g., Infineon® BGT24MTR11) including a local oscillator 56 coupled to at least one radar transmit antenna 58 for transmitting radar waves and at least one radar receive antenna 60 for receiving the radar waves after reflection from an object in a detection zone 62. Consequently, the at least one radar sensor assembly 20 is coupled to the vehicle body 16 for sensing a motion and characteristics (e.g., speed, angle, intensity) of the object in the detection zone 62 and outputting a sensor signal 64 corresponding to the motion of the object in the detection zone 62. An electronic control unit 66 or processor is coupled to (or part of) the at least one radar sensor assembly 20 (e.g., mounted to the radar printed circuit board 26). The electronic control unit 66 may be provided as a microprocessor configured to execute software code and/or instructions stored on a memory unit (not shown), such as an EEPROM or other type or memory device such as a solid state disk, RAM, hard disk or the like. Electronic control unit 66 may also include dedicated signal processing hardware circuitry for processing signals, and may include software as executed by a microprocessor for replicating such dedicated hardware, and may include a combination of hardware and software components. An external digital to analog converter 68 may also be utilized between the electronic control unit 66 and the at least one radar sensor assembly 20 for converting control signals from the electronic control unit 66 to the local oscillator 56 (e.g., $V_{coarse}$ and $V_{fine}$). The electronic control unit 66 can also include a frequency estimator 70 to estimate a frequency of the radar waves being transmitted by the at least one radar transmit antenna 58 and a plurality of input-output ports 71.

The at least one radar transmit antenna 58 provides an intermediate radar field within a predetermined distance from the rear bumper 18 of the vehicle 12 (i.e., the detection zone 62). The intermediate radar field enables the user 24 to interact, from a distance, with various gestures or motions including by not limited to, hand gestures, foot gestures, and/or full body gestures. Gestures could include motion, non-motion, or a combination thereof. The at least one radar transmit antenna 58 and/or at least one radar receive antenna 60 may be adjacent to the indicator 28, or, alternatively, attached to the rear bumper 18 of the vehicle 12, for example.

Figure 10:
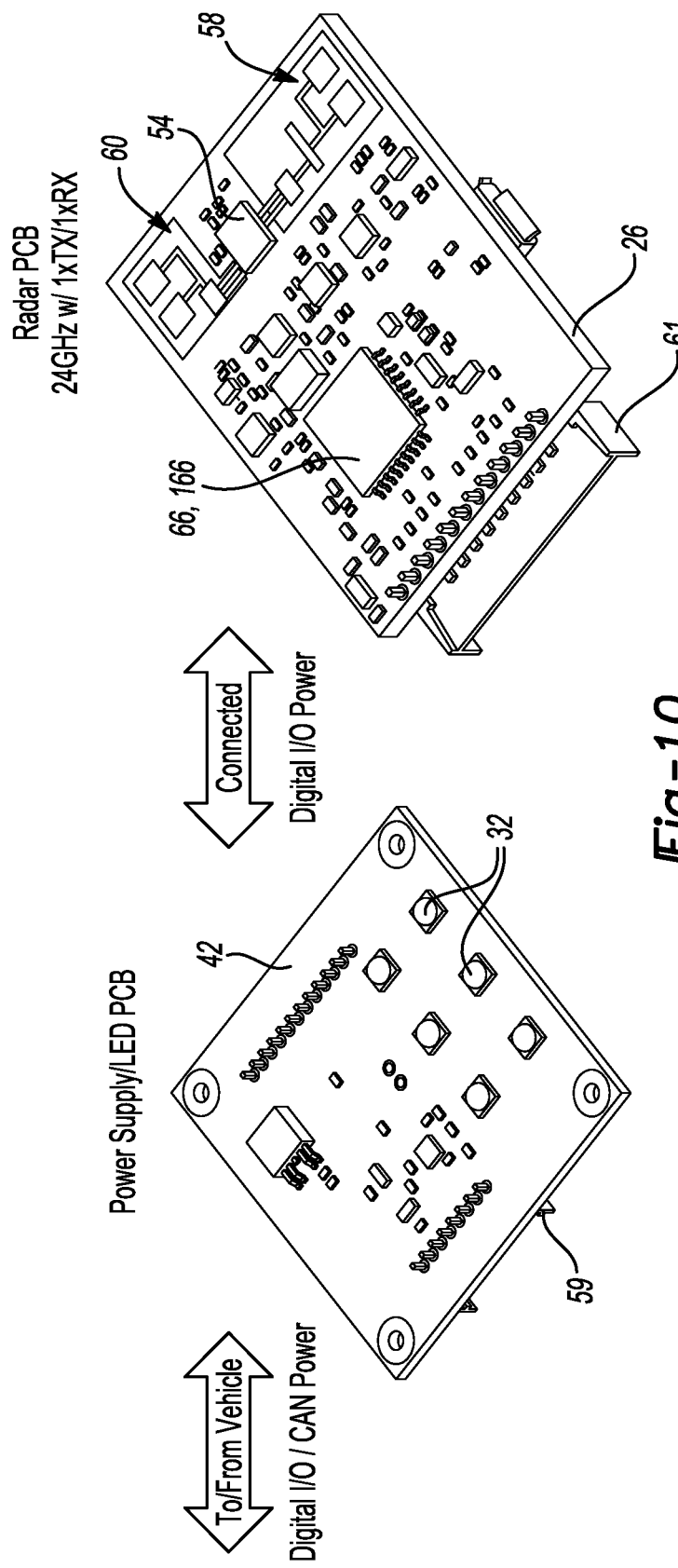
Figure 11A:
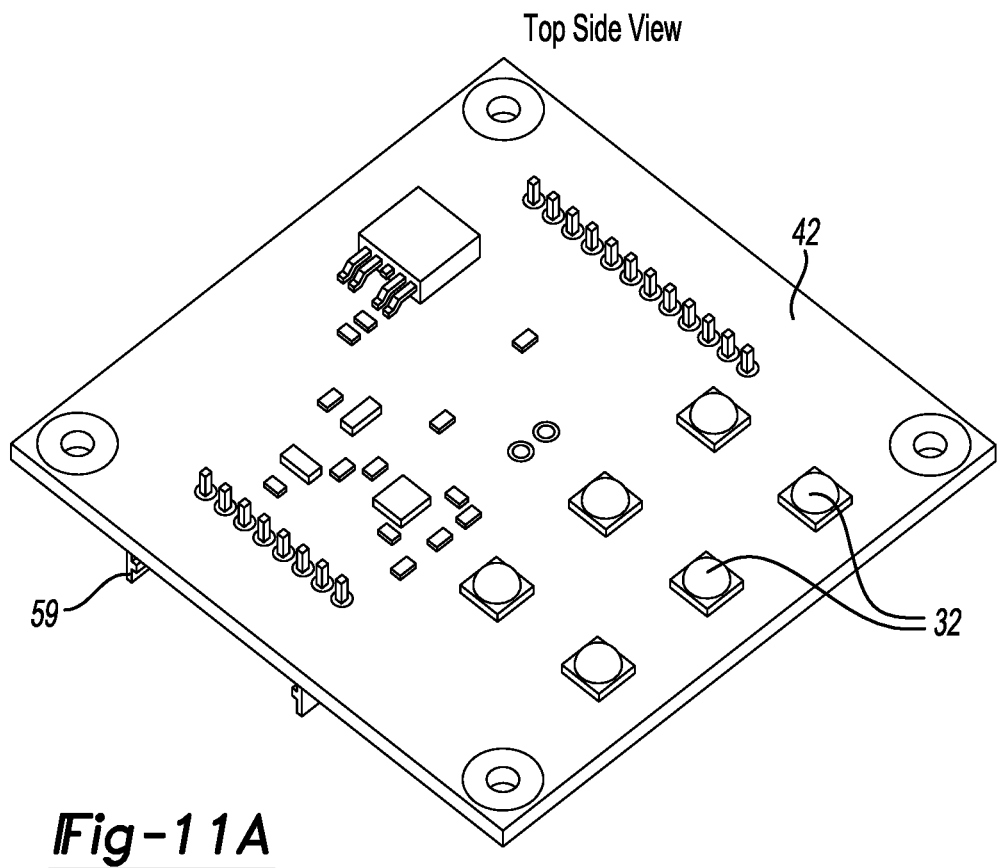
Figure 11B:
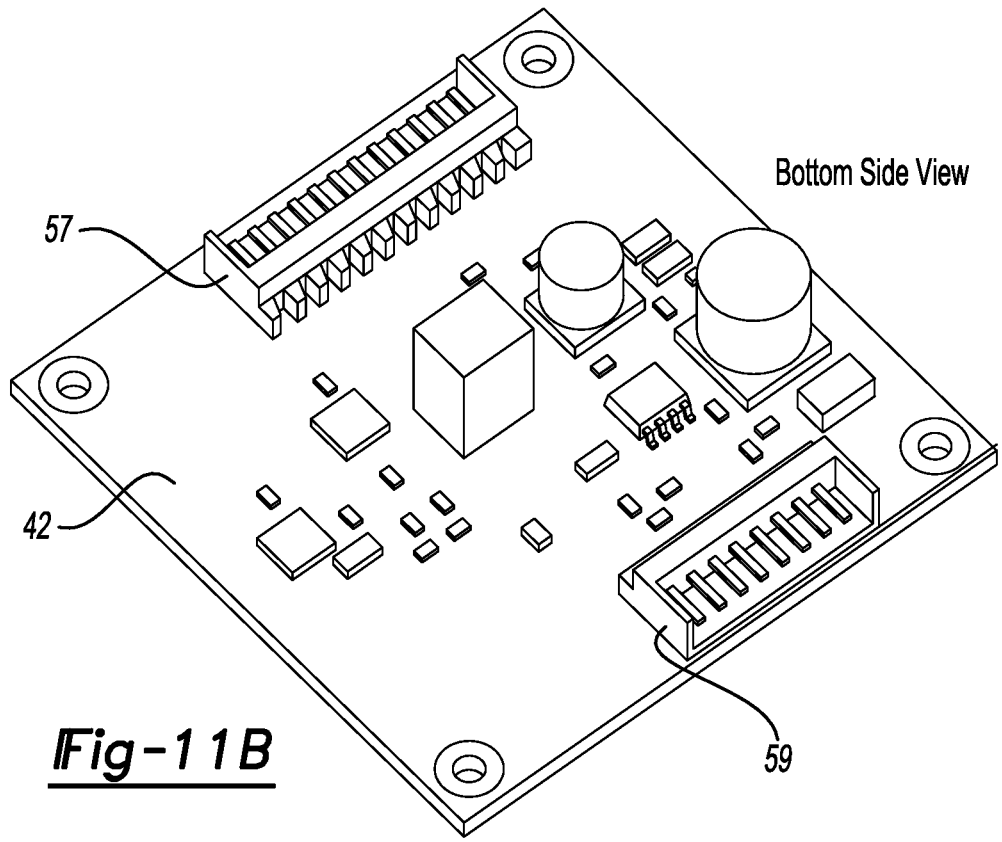
Figure 12A:
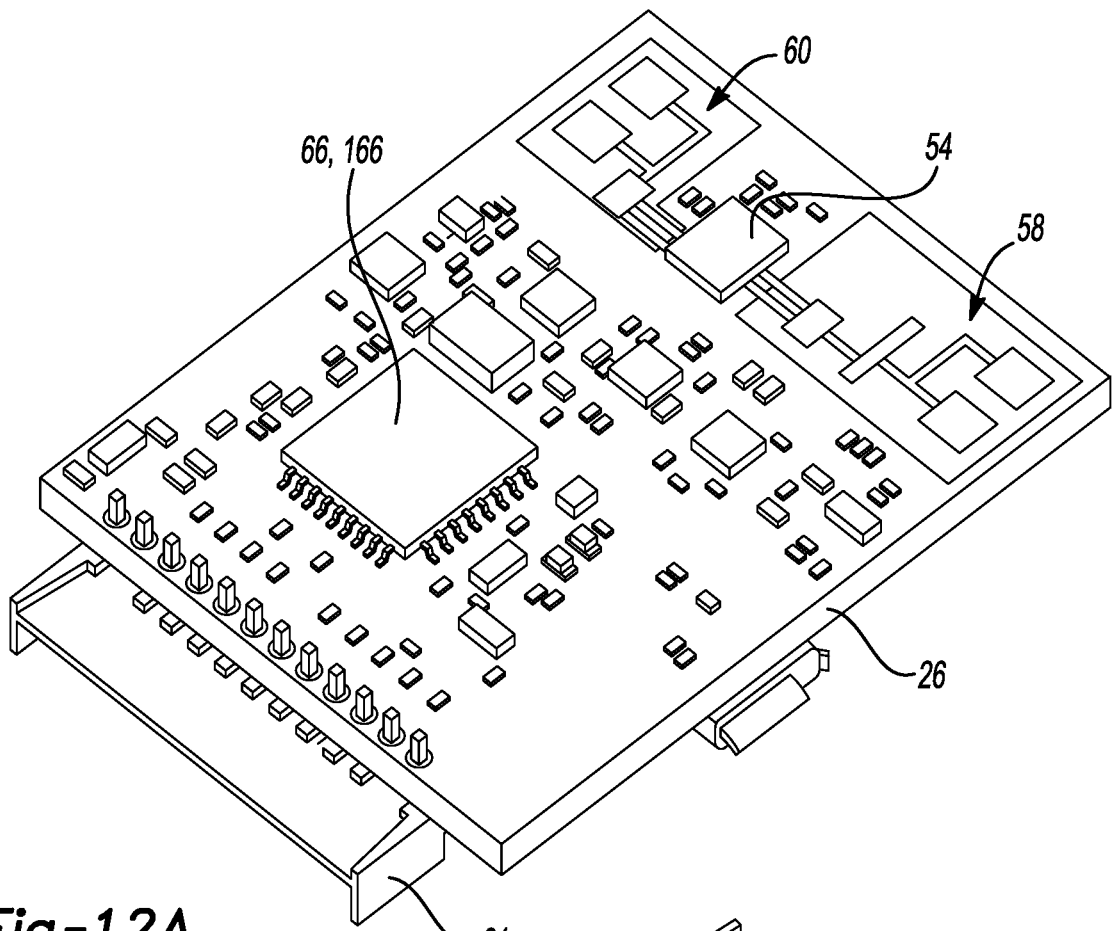
Figure 12B:
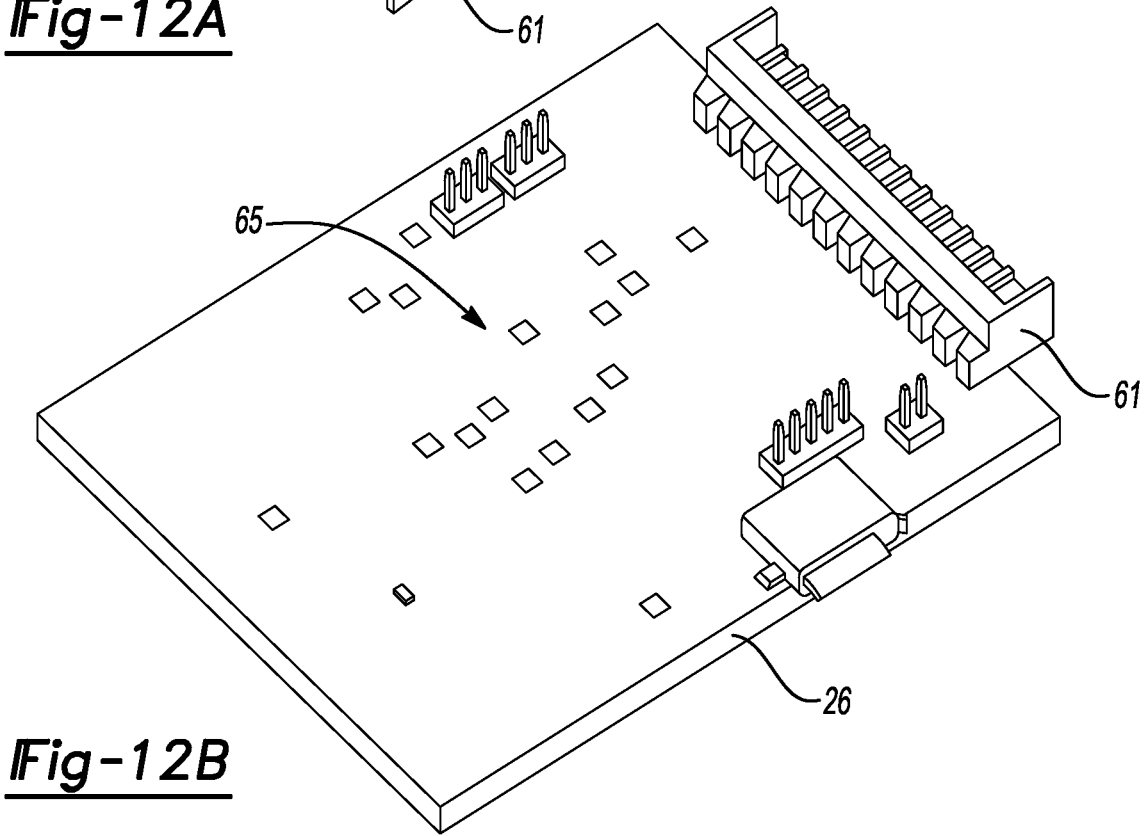
Figure 13A:
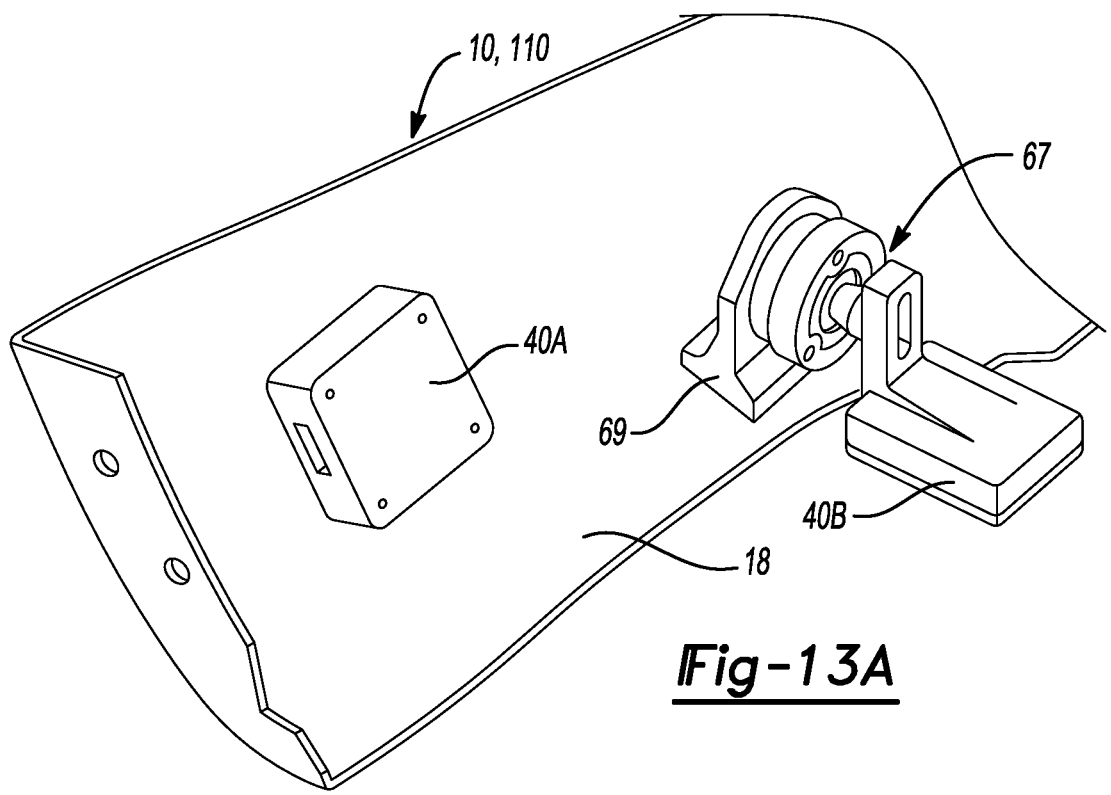
Figure 13B:
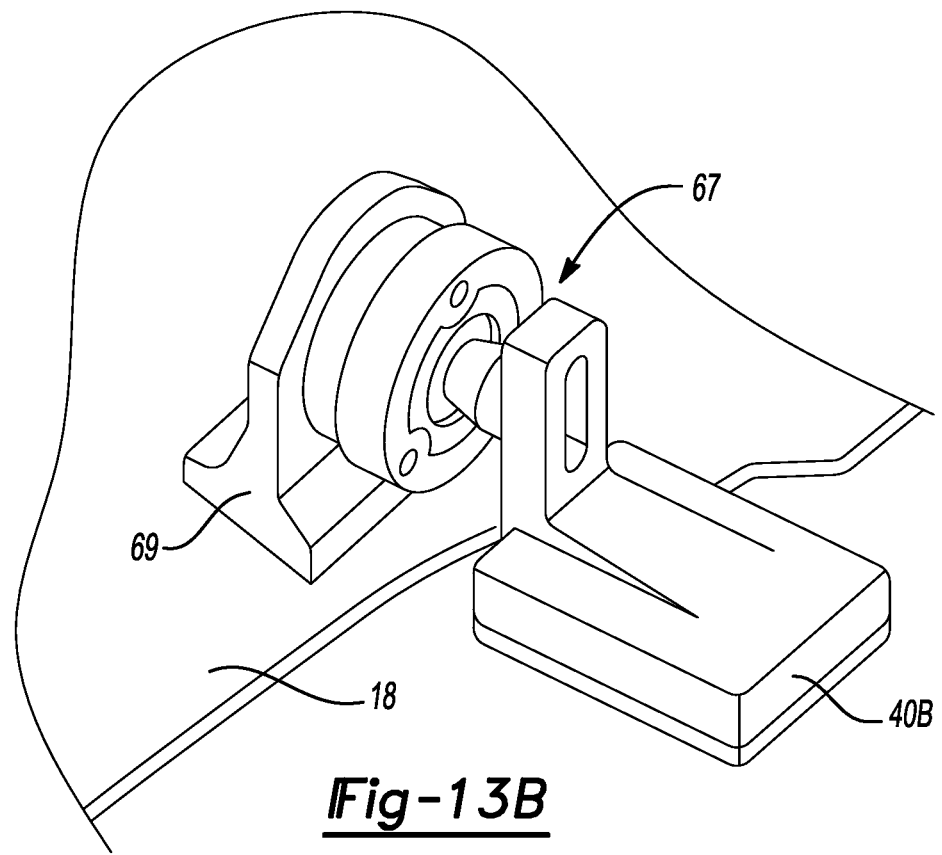
Figure 14A:
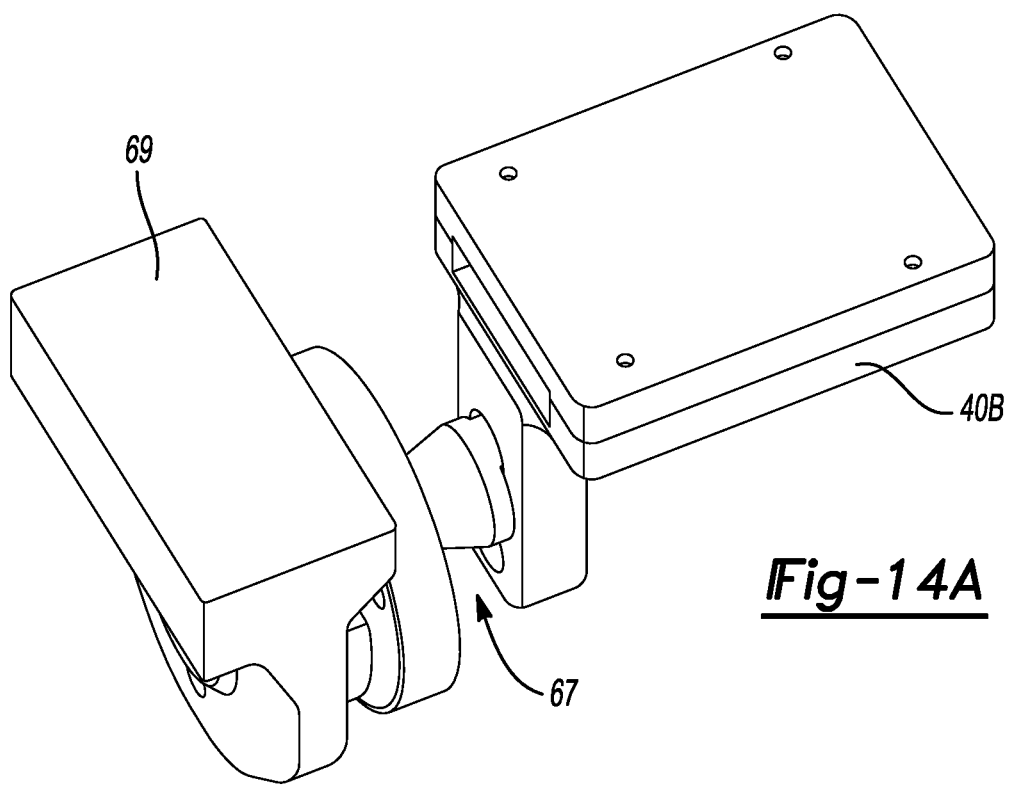
Figure 14B:
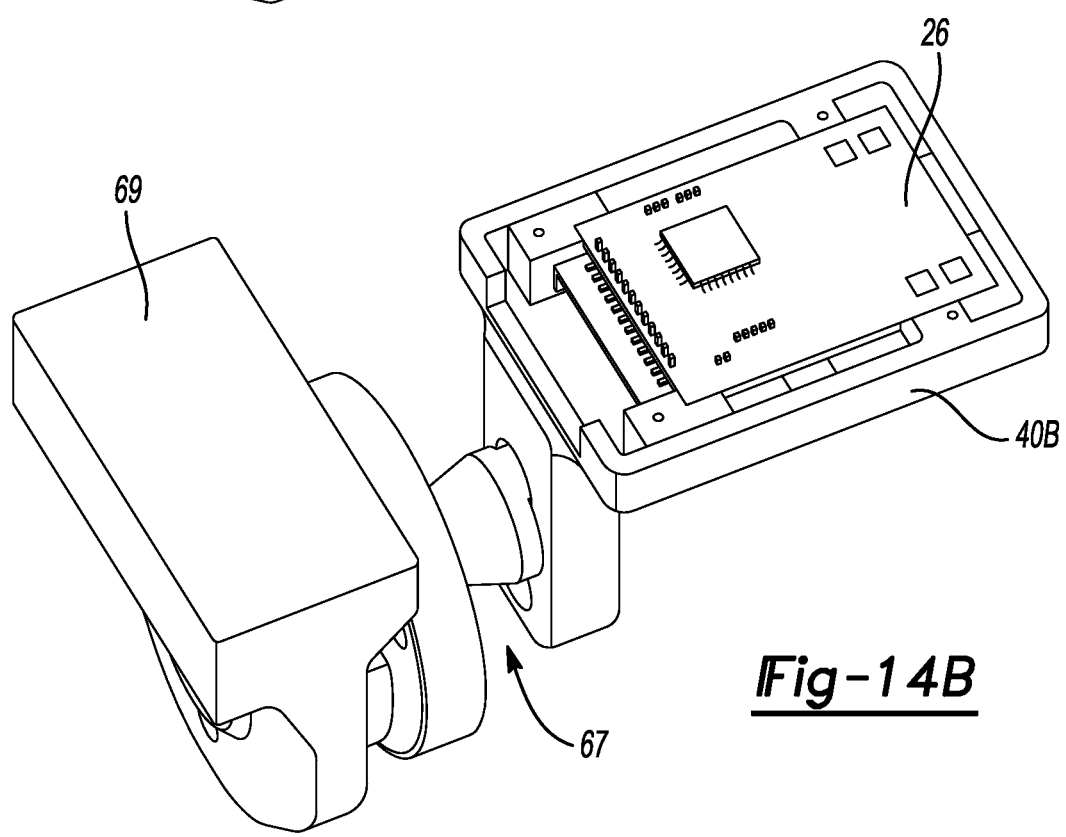

FIGS. 10, 11A-11B, and 12A-12B show additional views of the radar printed circuit board 26 and lighting printed circuit board 42. Specifically, the radar printed circuit board 26 and lighting printed circuit board 42 each communicate with one another as shown in FIG. 10 and as discussed above for FIG. 8, the lighting printed circuit board 42 can communicate with the vehicle 12 (e.g., using communication module 52). It should be appreciated that communication module 52 could instead or in addition be disposed on radar printed circuit board 26. In addition, the lighting printed circuit board 42 can provide electrical power to the radar printed circuit board 26; however, other configurations are contemplated (e.g., radar printed circuit board 26 directly connected to the vehicle 12 to receive power. As best shown in FIGS. 11A and 11B, the lighting printed circuit board 42 includes the at least one light emitting diode 32 on a first side of the lighting printed circuit board 42 and a radar board connector 57 for connecting with the radar printed circuit board 26 and a vehicle connector 59 for connecting with the vehicle 12 both disposed on a second side of the lighting printed circuit board 42 opposite the first side. As best shown in FIGS. 12A and 12B, the radar printed circuit board 26 includes the at least one radar transmit antenna 58 and the at least one radar receive antenna 60 connected to and disposed on opposite sides of the radar transceiver 54 as well as the electronic control unit 66 on one side of the radar printed circuit board 26 and a light and power board connector 61 for connecting with the lighting printed circuit board 42 and a plurality of test points 65 are disposed on an opposite side. Though the lighting printed circuit board 42 and radar printed circuit board 26 are shown with specific board layouts, it should be understood that other layouts are possible.

While the radar detection system 10, 110 is shown in a single housing 40 in FIG. 5, the use of the separate radar printed circuit board 26 and lighting printed circuit board 42 allow for two separate housings 40A and 40B to be utilized instead so that radar printed circuit board 26 and lighting printed circuit board 42 can be disposed remotely from one another. Specifically, as best shown in FIGS. 13A, 13B 14A, and 14B, the lighting printed circuit board 42 can be disposed in a first housing 40A (e.g., similar to housing 40 mounted in alignment with opening 34 defined in rear bumper 18) and radar printed circuit board 26 can be disposed in a second housing 40B, disposed remotely from the first housing 40A. In addition, the second housing 40B may be coupled to the rear bumper 18 via a ball mount 67 attached to a bumper bracket 69 that is attached to the rear bumper 18. The radar printed circuit board 26 may be oriented to transmit electromagnetic signals, such as radar signals, towards the ground 83 and adjacent the vehicle 12.

According to an aspect, the at least one radar transmit antenna 58 and/or the at least one radar receive antenna 60 can be configured to emit continuously modulated radiation, ultra-wideband radiation, or sub-millimeter-frequency radiation (e.g. frequencies forming part of the ISM frequency band about 24 GHz). For example, the at least one radar transmit antenna 58 can be configured to emit continuous wave (CW) radar, known in the art to use Doppler radar, employed as part of a radar based sensor as illustrated in FIG. 15. For example, the at least one radar transmit antenna 58 can be configured to emit modulated radiation, or frequency modulated continuous wave (FMCW) radar, also known in the art to use Doppler radar, employed as part of a radar based sensor as illustrated in FIGS. 16 and 17. Also, the sensors may be configured for pulsed time-of-flight radar. The at least one radar receive antenna 60 receives the reflections of such emitted waves, or senses the interactions within the intermediate radar field.

Referring to FIG. 15 in more detail, there is illustratively shown the at least one radar sensor assembly 20 employing a rapid low resolution Doppler radar based sensor 29. The radar sensor 29 can be configured to emit and detect continuous wave (CW) radar, as is illustratively shown with the radar sensor 29 including one transmit antenna 31 and one receive antenna 35, for providing a lower cost and simpler motion/object detection system. With such a configuration, the radar sensor 29 is operable to detect a speed/velocity of the object/user 37 using the Doppler Radar principles (i.e., processing by a signal processor 27, such as the electronic control unit 66, of the received reflected CW radar signal to determine frequency shifts of an emitted continuous wave 39 indicative of the speed of the object or user 37). In another embodiment, the radar sensor 29 is configured to only detect a speed/velocity of the object/user 37. The rapid, low resolution Doppler radar based sensor embodiment allows for the extraction of features characterizing the motion of the foot or object, such as speed and velocity of the object, in a less processing and power consumption embodiment for controlling the closure member 14. In this embodiment, the at least one radar sensor assembly 20 employs one transmit antenna 31 for transmitting the radar signal, and one receive antenna 35 for receiving the reflected radar signal. In accordance with another rapid, low resolution Doppler radar based sensor embodiment, the radar sensor 29 may be configured to extract features from the received reflected electromagnetic signal characterizing the motion of the foot or object including only the speed and velocity of the object, and the reflectivity/size of the object. The received reflected electromagnetic signal may be analyzed from which only frequency (indicative of speed and velocity of the object) and amplitude (indicative of reflectivity and size of the object) signal components can be extracted, the signal processor 27 being configured to calculate the speed of the object based on the Doppler effect, for example. As a result, a lower cost electronic control unit 66 can be provided capable of more quickly processing activation gestures.

Now referring to FIG. 16, there is illustratively shown the at least one radar sensor assembly 20 employing a higher resolution FMCW radar based sensor 29'. The higher resolution FMCW radar based sensor 29' allows for the extraction of multiple features characterizing the gesture of the foot, such as speed and velocity of the object 37, as well as angle, shape, size, reflectivity, and distance of the object 37. In this embodiment, the at least one radar sensor assembly 20 employs at least one transmit antenna 131 for transmitting the FMCW radar signal 55, and at least two receive antennas 35n for receiving the reflected radar signal, and the controller being configured to determine the user/object 37 specific motions. With such a configuration, the radar based gesture recognition system or radar detection system 10, 110 is operable to detect a gesture/motion (and characteristics) of the object/user 37 using the Frequency Modulated Radar techniques (i.e., processing by a signal processor 27, such as the electronic control unit 66, of the reflected FMCW radar signal to determine frequency shifts indicative of the speed (Doppler frequency) and distance (beat frequency) of the object/user 37). Alternatively the FMCW radar sensor 29" can be configured to include at least two receive antennas $35_1$, $35_2$, to $35_n$ forming an antenna array, as shown in FIG. 17 for capturing received reflected electromagnetic signals such as FMCW radar signals so that the captured received reflected electromagnetic signals can be processed by the electronic control unit 66 to extract a data set containing data relating to the distance and angles of the motion/object relative to the at least two receive antennas $35_1$, $35_2$, to $35_n$. Also, multiple transmit antennas $31_n$ may be provided. As a result, a more powerful microcontroller (MCU) can be provided capable of rapidly extracting data, such as speed, angle, distance, and reflectivity or size data, from reflected radar signal, to more accurately differentiating (higher accuracy) any activation gestures between different users. In accordance with another embodiment, at least one radar sensor assembly 20 configuration can be combined with the above described user-specific motion detection system for providing a higher accuracy user specific feature extraction activation system.

The intermediate radar field or detection zone 62 provided by at least one radar transmit antenna 58 can be a three-dimensional volume, e.g. hemispherical shape, cube, cone, ellipsoid, or cylinder. To sense gestures through obstructions, the at least one radar transmit antenna 58 can be configured to emit radiations capable of substantially penetrating fabric, wood, and glass. The at least one radar receive antenna 60 can be configured to receive the reflections from the human tissue through the fabric, as well as through plastic, ice, rain, snow, dirt, wood, and glass.

As best shown in FIG. 18, the electronic control unit 66 includes a data acquisition module 72 (e.g., implemented in software as instructions stored in a memory unit and executed by electronic control unit 66) to receive the sensor signal 64 corresponding to the motion of the object from the at least one radar sensor assembly 20. For example, the sensor signal 64 can be representative of a valid activation gesture or a random walk (i.e., other movements or activity detected that does not represent the valid activation gesture). To this end, the sensor signal 64 includes characteristics of the object (e.g., speed, angle, intensity). The electronic control unit 66 also includes a plurality of analysis modules 74 (for example, implemented in software as instructions stored in a memory unit and executed by electronic control unit 66) to analyze the sensor signal 64 to detect a plurality of extracted features and determine whether the plurality of extracted features are within a plurality of predetermined thresholds a1, a2, f1, f2 representing the valid activation gesture by a user 24 required to move the closure member 14. The electronic control unit 66 is configured to initiate movement of the closure member 14 in response to the plurality of extracted features being within the plurality of predetermined thresholds a1, a2, f1, f2 representing the valid activation gesture. The valid activation gesture includes a foot of the user 24 being placed adjacent to the at least one radar sensor assembly 20 and the foot of the user 24 (i.e., a step-in of the detection zone 62) being moved nonadjacent to the at least one radar sensor assembly 20 (i.e., a step out of the detection zone 62) after a predetermined period of time. Nevertheless, it should be understood that other valid activation gestures are contemplated.

When an object or motion is detected by the at least one radar sensor assembly 20, such as the foot, the at least one radar sensor assembly 20 sends data related to the object or motion to the electronic control unit 66 (i.e., processor executing software). The electronic control unit 66 processes the data from the at least one radar sensor assembly 20 to determine if the object or motion is the activation gesture required to open the rear liftgate 14, rather than a false signal. If the data indicates the presence of the correct or valid activation gesture, the electronic control unit 66 initiates opening of the rear liftgate 14. The plurality of predetermined thresholds a1, a2, f1, f2 can, for example, include at least one speed threshold based on a speed of the object. The plurality of predetermined thresholds a1, a2, f1, f2 may also include at least one speed threshold based on a speed of the object and at least one size threshold based on a size of the object.

The electronic control unit 66 is separate from and in communication with a power liftgate electronic control unit (not shown) and the electronic control unit 66 can initiate the opening of the rear liftgate 14 by communicating with the power liftgate electronic control unit (e.g., using the vehicle communication bus); however, it should be appreciated that the electronic control unit 66 itself could instead control the rear liftgate 14 or the functions of the electronic control unit 66 could alternatively be carried out by the power liftgate electronic control unit.

The electronic control unit 66 includes a signal transformation module 76 (for example, implemented in software as instructions stored in a memory unit and executed by electronic control unit 66) to transform the sensor signal 64 from a time domain representation to a frequency domain representation of the sensor signal 64. The speed of the object can, for example, correspond to a frequency in the frequency domain representation and the size of the object can correspond to an amplitude in the frequency domain representation. According to an aspect, the signal transformation module 76 utilizes a fast Fourier transform (FFT) for converting the sensor signal 64 from the time domain to the frequency domain. The FFT signal processing step may be provided as part of the operating steps executed by the electronic control unit 66 as illustrated for example in FIG. 26. Other signal transformation processing is possible.

According to the example embodiment, shown in FIG. 19, as the user 24 approaches the vehicle 12, the vehicle 12 senses the key fob 22 and activates the radar detection system 10 and the indicator 28. It is recognized that in another embodiment, the radar detection system 10 may be activated in other manners without the use of a key fob 22 and an indicator 28 is not provided. The radar detection system 10 has a triggering event mode and a non-triggering event mode. As discussed above, the indicator 28 in accordance with the example embodiment is a light disposed on the rear bumper 18 to notify the user 24 that the system 10 is activated and waiting for the activation gesture from the user 24 to open the rear liftgate 14. The indicator 28 also notifies the user 24 of the correct position to perform the activation gesture, e.g. the presence of a foot. It is recognized that the indicator 28 may not be required to notify the user 24 of the correction position to perform the activation gesture, the radar detection system 10 having a wide field of view as illustrated as detection zone Z2 in FIG. 28. At the same time, the at least one radar transmit antenna 58 produces the intermediate radar field adjacent to the indicator 28 and the vehicle 12.

For the example embodiment, the indicator 28 notifies the user 24 by illuminating a red light. To initiate the triggering event mode, the user 24 places his or her foot under the lighted indicator 28. When the user 24 places his or her foot under the lighted indicator 28 (e.g., such a motion may be a natural and intuitive "step-in" involving moving his or her foot into the detection zone 62 in a motion equivalent to a step, which an initial entry into the detection zone 62 at a position above the ground, followed by a motion towards the ground and towards the vehicle 12, and finally the motion terminating with the foot contacting the ground in the detection zone 62), the at least one radar receive antenna 60 of the radar sensor assembly 20 receives reflections from interactions in the intermediate radar field. Then, the electronic control unit 66 processes and analyzes the received reflections to provide gesture data usable to determine the gesture. For the electronic control unit 66 to process the received reflections to conclude a valid gesture has been made, the user 24 may have to leave his or her foot stationary for a require period of time, e.g. four seconds. Once the user 24 leaves his or her foot stationary for the required period of time and the proper gesture is provided, the indicator 28 notifies the user 24 by flashing an illuminated yellow light. In this example, the gesture consists of a sequential combination of a motion into the detection zone 62, and a non-movement of the foot in the detection zone 62. Next, the radar detection system 10 initiates the opening of the rear liftgate 14. On the other hand, if the user 24 leaves his or her foot stationary but does not meet the required period of time, i.e. less than four seconds needed to initiate the opening of the rear liftgate 14, the non-triggering event mode is initiated. During the non-triggering event, the indicator 28 quickly flashes the illuminated yellow light to indicate to the user 24 that the gesture made by the user 24 does not meet the requirement for opening the rear liftgate 14.

It should be appreciated that various techniques may be used for the detecting the interactions in the intermediate radar field. For the example embodiment, as illustrated in FIG. 20, the gesture technique is based on motion detection. As shown in FIG. 20, to unlock or actuate the system 10 (door or liftgate 14) the user 24 has put his or her foot in the range of the radar zone, e.g. the intermediate radar field, and then wait a period of time T before moving his or her foot out of the range of the radar to activate the system 10. In other words, the user 24 must put his or her foot in the intermediate radar field for the required period of time T before removing his or her foot. No movements, or substantial movements, are allowed within the period T after the first detection. If the system 10 detects a second movement within the period T, the algorithm will ignore the first detection and go to a reset state and then wait for a new input, or a new gesture (e.g., a new step-in). During the required period of time T, to activate the system 10, it is preferred that the user 24 makes no additional movements in the intermediate radar field. If the system 10 detects a second interaction, i.e. an additional movement made by the user 24, in the intermediate radar field within the required period of time T, the first interaction detected by the radar receive antenna 60 will be ignored by the system 10 and the system 10 will reset and wait for a new interaction made by the user 24.

Alternatively, in accordance with another example embodiment, as illustrated in FIG. 21, a dual motion detection technique may be employed for detecting interactions in the intermediate radar field. To activate the system 10, the user 24 should provide a first interaction in the intermediate radar field, e.g. put his or her foot in the intermediate radar field. As shown in FIG. 21, to unlock or actuate the system 10, the user 24 puts his foot in the range of the detection zone 62 and then removes it within the time T and T+Δt to activate the system 10. After providing the first interaction, the user 24 should provide a second interaction in the detection zone 62 within the required period of time T plus a time delay Δt, e.g. quickly removing his or her foot from the intermediate radar field. However, no second detections are allowed after the first detection and before T. If the system 10 detects a second movement, the algorithm will ignore the first detection and go to a reset state and wait for a new input. During the required period of time T, it is preferred that the user 24 should not make additional interactions in the intermediate radar field. If the system 10 detects a second interaction in the intermediate radar field during the required period of time T, the first interaction detected by the antenna element will be ignored by the system 10 and the system 10 will reset and wait for a new interaction made by the user 24. Similarly, if there is no second detection after the expiration of the allowed time T+Δt, the algorithm will ignore the first detection and go to a reset state and then wait for a new input. In other words, if the system 10 detects no second interaction within the time delay Δt after the required period of time T, the system 10 will reset and wait for a new interaction made by the user 24. It should be appreciated that the radar detection system 10 can be used in connection with other applications including non-contact (i.e. gesture based) activation of power opening closures such as power doors, power liftgates, power trunks, frunks (i.e., powered activation of a front hood enclosing a front storage compartment) and power sliding doors (i.e. minivans). In addition, these techniques could also apply to other non-automotive applications that could benefit from gesture based activation of systems 10.

As mentioned above, the plurality of analysis modules 74 analyze the sensor signal 64 (e.g., a frequency domain representation of the sensor signal 64) and determine whether the sensor signal 64 associated with the motion of the object is a correct activation gesture by a user 24 required to move the closure member 14. Referring back to FIG. 18, the plurality of analysis modules 74 can include a motion detector module 78 configured to receive the frequency domain representation 79 of the sensor signal 64 and identify at least one peak 81 of the frequency domain representation of the sensor signal 64 having a peak amplitude at a peak frequency (FIG. 22). The motion detector module 78 (for example, implemented in software as instructions stored in a memory unit and executed by electronic control unit 66) can determine if the peak amplitude is less than a first predetermined amplitude a1 and greater than a second predetermined amplitude a2 and determine if the peak frequency is greater than a first predetermined frequency ft and less than a second predetermined frequency f. Furthermore, the motion detector module 78 can register the at least one peak as at least one registered motion, such as a foot motion, in response to the peak amplitude being less than the first predetermined amplitude a1 and greater than the second predetermined amplitude a2 and the peak frequency being greater than the first predetermined frequency ft and less than the second predetermined frequency f. More specifically, the first predetermined frequency ft threshold can be representative of a lower speed of the foot/object above which the motion detector module 78 will consider an invalid activation gesture (i.e. too fast) and the second predetermined frequency f2 threshold that is greater than the first predetermined frequency ft threshold can be representative of a higher speed threshold of the foot/object below which the motion detector module 78 will consider an invalid activation gesture (i.e., too slow). The first predetermined amplitude a1 threshold can be representative of a lower electromagnetic reflectivity of the object indicative of a smaller size of the object for example and the second predetermined amplitude a2 threshold that is greater than the first predetermined amplitude a1 threshold can be representative of a larger size. The object can be a foot of a user 24 and the plurality of predetermined thresholds at, a2, f1, f2 are related to the motion of the foot being at least one of a step into the detection zone 62 and a step out of the detection zone 62 and a kick in the detection zone 62. Signals associated with an example foot motion are shown in FIG. 25. As illustrated in FIG. 25, the MAG lines show the magnitude, and the differences between the VEL (velocity) lines for a foot motion.

Figure 1:
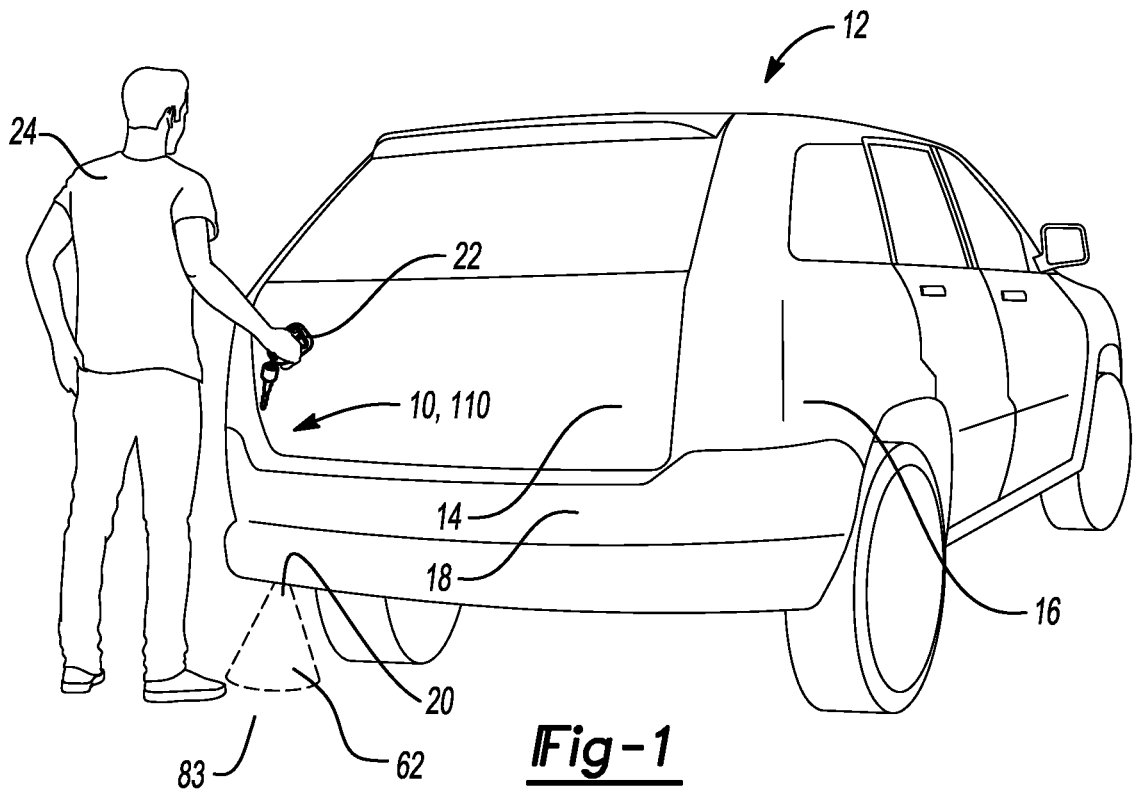
FIG. 1 is a perspective view of an example motor vehicle equipped with a radar detection system for opening a rear liftgate of the vehicle which shows the location of at least one radar sensor assembly and is constructed in accordance with the teachings of the present disclosure.
Figure 2:
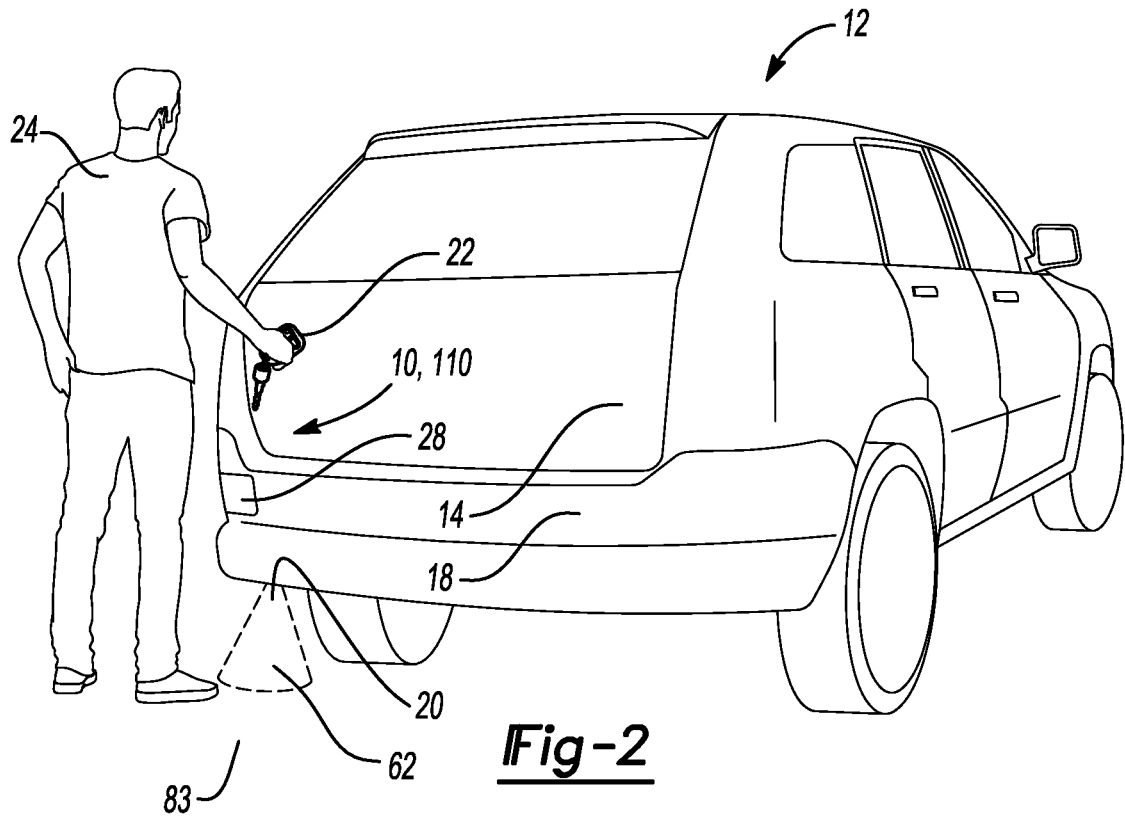
FIG. 2 is another perspective view of an example motor vehicle equipped with the radar detection system for opening a rear liftgate of the vehicle which shows the location of an indicator and is constructed in accordance with the teachings of the present disclosure.

Also the predetermined thresholds at, a2, f1, f2 can be related to the non-motion of the foot being held within the detection zone 62 and placed on the ground surface 83 (FIGS. 1-3). An external user interface 91 (FIG. 18), such as a switch or interface provided within the vehicle cabine, or the FOB 22 can be provided to configure the motion detector module 78 which would allow the predetermined thresholds a1, a2, f1, f2 to be adjusted, for example predetermined thresholds a1, a2, f1, f2 which can be set to satisfy the typical user of an intuitive motion, or allow subsequent fine tuning by a user who would like to customize the predetermined thresholds a1, a2, f1, f2 according to their preference. For example, with reference to FIG. 22, predetermined thresholds ft may be increased (arrow Fi) while f2 may be decreased (arrow Fd) to allow a user to activate the system 10 using a narrower motion velocity range, for example an activation speed classification ranging between 5 centimeters per second to 25 centimeters per second may be narrowed to between 10 centimeters to 20 centimeters per second according to a user preference. Predetermined threshold ft may be decreased while f2 may be increased to widen the activation range. In accordance with an example with reference to FIG. 23, predetermined threshold ft may be adjusted to 0 Hz, while f2 adjusted to 20 Hz, representing a motion detection criteria of motion, no motion, or nearly no motion causing activation of the system when combined with a predetermined time during which such motion, no motion, or nearly no motion occurs. In accordance with an example with reference to FIG. 24, predetermined thresholds ft may be adjust to 80 Hz, while f2 be adjusted to infinity, representing any motion above a speed represented by f2 causing activation of the system. Predetermined thresholds at, a2 may be similarly adjusted (illustrated by arrows Ai and Ad) to narrow or widen the programmable detection range based on the size of the object desired to trigger the system 10, as an illustrative example. Thus, for example, the predetermined thresholds at, a2, f1, f2 can be calibrated by a system manufacturer (e.g., at the factory) and/or dynamically selected by a user using the external user interface 91. So, the at least one registered foot motion can include a foot in motion defined as a foot of the user 24 being placed adjacent to the at least one radar sensor assembly 20 being held stationary adjacent to the at least one radar sensor assembly 20 and a foot out motion defined as the foot of the user 24 being moved nonadjacent to the at least one radar sensor assembly 20. When this exemplary detection technique is employed with the at least one radar sensor assembly 20 implementing Doppler radar in the ISM band, a simple detection system is provided requiring less powerful and costly hardware components, power consumption, as well as antenna complexity, and one which is computationally rapid for analyzing motion signals.

The plurality of analysis modules 74 can include a decision algorithm module 80 (e.g., implemented in software as instructions stored in a memory unit and executed by electronic control unit 66) coupled to the motion detector module 78. As best shown in FIGS. 25 and 26, the decision algorithm module 80 is configured to receive the foot in motion from the motion detector module 78 and register the foot in motion as a first detection when the motion of the foot falls within the predetermined thresholds a1, a2, f1, f2. The decision algorithm module 80 can also be configured to wait for a predetermined time and determine if the foot in motion is held for the predetermined time (e.g. a stationary foot can be determined by detecting if there has been motion represented by a frequency domain representation of the signal not containing a frequency component, while the frequency amplitude remains within the predetermined thresholds a1, a2.) Next, the decision algorithm module 80 can be configured to receive the foot out motion from the motion detector module 78 and register the foot out motion as a second detection. The decision algorithm module 80 can also be configured to determine if the foot out motion is completed within a time delay. The decision algorithm module 80 is also configured to register the correct activation gesture and wait for another first detection in response to determining that the foot in motion is held for the predetermined time and the foot out motion is completed within the time delay. Thus, as shown in FIG. 25, to unlock or actuate the liftgate 14, the user 24 puts his foot within the range of the at least one radar sensor assembly 20. This motion is translated to a peak on the frequency domain plot, as shown in figure as (A). Then, the user 24 holds his foot, without moving for a period of time T, as shown in the figure as (B). After the expiration of the waiting period the user 24 removes his foot to activate the system 10, figure (C). The removing of the foot must occur during the Δt interval to register the activation.

The decision algorithm module 80 may also be configured to reset in response to determining that the foot in motion is not held for the predetermined time and/or in response to determining that the foot out motion is not completed within the time delay Δt. The decision algorithm module 80 may then be configured to ignore the at least one peak in response to at least one of the peak amplitude being greater than the first predetermined amplitude a1 and the peak amplitude being less than the second predetermined amplitude a2 and the peak frequency being less than the first predetermined frequency f1 and the peak frequency being greater than the second predetermined frequency f2 (i.e., a random walk signature).

FIG. 27 shows an example radar operation flow chart. Specifically, the system 10, 110 can remain in an idle state while a battery voltage is normal and a radar frequency is not tuned and a radar data flag indicates not ready; however, the system 10, 110 can begin to sample the sensor signal 64 to fill a buffer until the radar data flag indicates ready and an FFT data flag indicates not ready. Next, the fast Fourier transform can be carried out on the sensor signal 64 from the buffer (e.g., by the signal transformation module 76) to convert the sensor signal 64 from the time domain to the frequency domain until the FFT data flag indicates ready. Then, the frequency domain radar data can be output and the system 10, 110 can return to sampling the sensor signal 64 to fill the buffer.

As best shown in FIG. 29, the electronic control unit 166 of a second exemplary embodiment of the radar detection system 110 also includes the plurality of analysis modules 174 to analyze the sensor signal 164 to detect a plurality of extracted features (FIG. 30) and match the plurality of extracted features to a plurality predetermined matching classes associated with a valid activation gesture by a user 24 required to move the closure member (e.g., liftgate 14). The analysis of the sensor signal 164 to detect a plurality of extracted features and classifying the plurality of extracted features according to a plurality predetermined matching classes associated with the valid activation gesture by the plurality of analysis modules 174 can be carried out in the time domain. In more detail and as an illustrative example, the electronic control unit 166 can configured to apply an signal filter, such as an envelope filter (FIG. 30) to the sensor signal 164 in the time domain to generate a first signature feature of the plurality of extracted features, such as envelope 165, and compare the first signature feature to a predetermined first signature feature representative of the valid activation gesture. Other signal processing may be applied to the sensor signal 164, including processing in the frequency domain. The electronic control unit 166 is configured to initiate movement of the closure member in response to the plurality of extracted features matching at least one of the plurality predetermined matching classes associated with the valid activation gesture.

The plurality of extracted features may be representative of at least one of a speed of the object and a distance from the at least one radar sensor assembly 20 to the object and a size of the object and an angle of the object relative to the at least one radar sensor assembly 20. Therefore, the plurality of analysis modules 174 can be configured to receive the sensor signal 164 and determine if the plurality of extracted features match with a predetermined speed class of the plurality predetermined matching classes associated with the valid activation gesture. For example, the predetermined speed class may classify a valid object speed as between 10 centimeters per second to 15 centimeters per second. The plurality of analysis modules 174 can also be configured to determine if the plurality of extracted features match with a predetermined distance class of the plurality predetermined matching classes associated with the valid activation gesture (i.e., not a random walk signature). For example, and with reference to FIG. 28, the predetermined distance class may classify a valid object distance from the at least one radar sensor assembly 20 as between 40 centimeters and 50 centimeters represented as distance D1, or a lesser distance, as between 20 centimeters and 30 centimeters represented as distance D2 as examples only. Similarly, the plurality of analysis modules 174 can be configured to determine if the plurality of extracted features match with a predetermined angle class of the plurality predetermined matching classes associated with the valid activation gesture. For example, and with reference to FIG. 28, the predetermined speed class may classify a valid object angle as between −45 degrees to +45 degrees from the vertical, as shown as $\theta_2$ in FIG. 3A, representing a first detection zone Z1. The predetermined speed class may classify a valid object angle as between −60 degrees to +60 degrees from the vertical, as shown as $\theta_1$ in FIG. 3A, representing a second detection zone Z2 larger than the first detection zone and illustratively provided a detection zone adjacent the width of the rear bumper of the vehicle 12. As another example, the predetermined speed class may classify a valid object angle as between 0 degrees to +45 degrees from the vertical for providing a detection zone only to one side of the radar sensor assembly 20. The plurality of analysis modules 174 may also be configured to determine if the plurality of extracted features match with a predetermined size class of the plurality predetermined matching classes associated with the valid activation gesture. For example, the predetermined size class may classify a valid object size as between 20 $cm^2$ and 40 $cm^2$ when transmitting electromagnetic radiation in the K Band ranges from 18 to 26.5 GHz for example. The plurality of analysis modules 174 can then be configured to register the plurality of extracted features as the valid activation gesture in response to the plurality of extracted features matching at least one of the predetermined speed class and the predetermined distance class and the predetermined angle class and the predetermined size class of the plurality predetermined matching classes associated with the valid activation gesture. Each of the predetermined classes can be calibrated by a system manufacturer (e.g., at the factory) and/or dynamically selected by a user using the external user interface 91, or FOB 22. For example a user may select by a user interface, such as a touch screen provided in the interior of the vehicle a preferred activation gesture, such as "slow" gesture activation setting or mode corresponding to the predetermined speed class classify a valid object speed as between 10 centimeters per second to 15 centimeters per second, or the user may select a "fast" gesture activation setting or mode corresponding to the predetermined speed class classify a valid object speed as between 5 centimeters per second to 10 centimeters per second. Other predetermined classes may be selected and the radar system programmed in such as manner.

The analysis of the sensor signal 164 to detect a plurality of extracted features and classifying the plurality of extracted features according to a plurality predetermined matching classes associated with the valid activation gesture by the plurality of analysis modules 174 can also be carried out in the frequency domain. Thus, the plurality of analysis modules 174 can also include a feature extraction module 182 configured to receive the frequency domain representation of the sensor signal 164 for a foot in motion and a foot out motion (the feature extraction module 182 could alternatively operate with the sensor signal 164 in the time domain). It should be understood that some pre-processing may take place to ensure the successful convergence to a unified set of data. The feature extraction should be robust to large input variance. The feature extraction module 182 can also be configured to identify a plurality of extracted features of the frequency domain representation of the sensor signal 164 and output the plurality of extracted features of the frequency domain representation of the sensor signal 164. The plurality of extracted features of the frequency domain representation of the sensor signal 64 may include at least one of a signal amplitude of the sensor signal 164 and a standard deviation of the sensor signal 164 and a time difference between the foot in motion and the foot out motion. It should be understood that the analysis of the sensor signal 164 to detect the plurality of extracted features and classifying the plurality of extracted features according to a plurality predetermined matching classes can even be carried out both in the time domain and the frequency domain. For example, classification may include determining if an extracted speed feature of 12 centimeters per second is matched or falls within with a predetermined speed class classifying a valid object speed as between 10 centimeters per second to 15 centimeters per second, and determining if an extracted size feature of 30 $cm^2$ is matched or falls within a predetermined size class classifying a valid object size as between 20 $cm^2$ and 40 $cm^2$. If the extracted speed feature and size feature are matched with the predetermined speed class and predetermined size class, a valid activation gesture is determined.

The plurality of analysis modules 174 can also include a recognition stage module 184 coupled to the feature extraction module 182 for receiving the plurality of extracted features of the frequency domain representation (and/or time domain representation) of the sensor signal 164 and registering the correct activation gesture in response to classifying the plurality of extracted features of the frequency domain representation of the sensor signal 164 matching an activation gesture class of the plurality predetermined matching class associated with the activation gesture. So, the input to the recognition stage module 184 is a set of features based on selected performance criteria extracted from the raw data set of the reflected radar waves. The output of the recognition stage module 184 is the final decision to either unlock and open the liftgate 14 or ignore because the signature was classified as a random walk (i.e., not the valid activation gesture).

The recognition stage module 184 can include an artificial neural network module 186 including a neural network with a plurality of layers each having a plurality of neurons weighted by a plurality of neuron weights and interconnected by connections weighted by a plurality of connection weights. The plurality of neuron weights and the plurality of connection weights of the neural network can be trained based on the valid activation gesture. Thus, the neural network can be configured to receive the plurality of extracted features of the sensor signal 164 and match the plurality of extracted features of the sensor signal 164 to a plurality of predetermined matching classes. The neural network can also be configured to classify the plurality of extracted features of the sensor signal 164 according to the matching of the plurality of extracted features of the of the sensor signal 164 to the plurality of predetermined matching classes. It should be understood that an initial training of the neural network can be done by a manufacturer of the radar detection system 110 (e.g., a sample set of thirty people may be employed to set what the manufacturer considers the best step-in, step-out for a desired opening of the liftgate 14). Then, the neural network can also be trained in the field, either in a field training mode, or an adaptive training mode over the continued use of the radar detection system 110. The neural network could take samples of the new owner's step-in and step out to more closely match what a user 24 considers a natural or intuitive gesture activation motion, such as a step-in and step-out for activation and updates the parameters or weights of the neural network.

According to an aspect, the neural network can be configured to receive the plurality of features of the frequency domain representation (and/or of the time domain representation) of the sensor signal 164 and match the plurality of features of the frequency domain representation (and/or of the time domain representation) of the sensor signal 164 to a plurality of predetermined matching classes. The neural network can then be configured to classify the plurality of features of the frequency domain representation (and/or of the time domain representation) of the sensor signal 164 according to the matching of the plurality of features of the frequency domain representation matching to the plurality of predetermined matching classes. Again, the valid activation gesture can include a foot of the user 24 being placed adjacent to the at least one radar sensor assembly 20 and the foot of the user 24 being moved nonadjacent to the at least one radar sensor assembly 20 after a predetermined period of time. So, the recognition stage module 184 performs both an initial training function and then a "classifying" function capable of binning each input raw data set to the closest matching class using the neural network.

The recognition stage module 184 can additionally include a neural network training module 188 coupled to the artificial neural network module 186 and configured to receive a plurality of initial training sets of the plurality of features of the frequency domain representation (and/or of the time domain representation) of the sensor signal 164.

The neural network training module 188 can adjust the plurality of neuron weights and the plurality of connection weights based on the plurality of initial training sets of the plurality of features of the frequency domain representation of the sensor signal 164. The neural network training module 188 is also configured to receive a plurality of later training sets of the plurality of features of the frequency domain representation (and/or of the time domain representation) of the sensor signal 164 and adjust the plurality of neuron weights and the plurality of connection weights based on the plurality of later training sets of the plurality of features of the frequency domain representation of the sensor signal 164. The neural network of the artificial neural network module 186 is a non-linear regression model; however, it should be appreciated that other types of neural networks may be alternatively utilized.

Thus, as in the first embodiment of the system 10, the plurality of analysis modules 174 of the second embodiment of the system 110 analyze the sensor signal 164 (e.g., the frequency domain representation and/or of the time domain representation of the sensor signal 164) and determine whether the sensor signal 164 associated with the at least one of the object and motion is the valid activation gesture by a user 24 required to move the closure member. Providing a neural network in conjunction with the activation system described herein allows for a more robust activation system less susceptible to different user movement variances, allowing for positive activations of a large set of users. As a result, the user does not have to adjust his or her movements to conform to the system, but rather the system will adjust its recognition criteria to the user.

As best shown in FIGS. 31 and 32A-32C, a method of operating a radar detection system 10, 110 for user-activated, non-contact operation of a closure member (e.g., rear liftgate 14) coupled to a vehicle body 16 of a vehicle 12 is also provided. According to the example embodiment, as the user 24 approaches the vehicle 12, the vehicle 12 senses the key fob 22 and powers on the radar detection system 10, 110. So, the method can include the steps of sensing a key fob 22 and powering on the radar detection system 10, 110. Once the system 10, 110 wakes up, the at least one radar sensor assembly 20 and indicator 28 are activated.

Thus, the method can include the step of 200 activating at least one radar sensor assembly 20. More specifically, the method includes the step of 202 transmitting radar waves near the vehicle 12 using at least one radar transmit antenna 58 of at least one radar sensor assembly 20 coupled to the vehicle 12. Then, the method proceeds by 204 receiving the radar waves after reflection from an object in a detection zone 62 using at least one radar receive antenna 60 of the at least one radar sensor assembly 20. The method can also include transforming the sensor signal 64, 164 from a time domain representation to a frequency domain representation of the sensor signal 64, 164 using a signal transformation module 76, 176 of the electronic control unit 66, 166.

Next, the method can include the step of 206 outputting a sensor signal 64, 164 corresponding to the motion and characteristics of an object in the detection zone 62 using the at least one radar sensor assembly 20. The method also includes the step of 208 receiving the sensor signal 64, 164 corresponding to motion and characteristics of the object from the at least one radar sensor assembly 20 using a data acquisition module 72, 172 of an electronic control unit 66, 166 coupled to the at least one radar sensor assembly 20. The method continues with the step of 210 filtering the sensor signal 64, 164 received using the electronic control unit 66, 166 to filter non-moving objects. The method can then include the step of 212 extracting a plurality of extracted features of the sensor signal 64, 164 using a plurality of analysis modules 74, 174 of the electronic control unit 66, 166. The method also includes the step of 214 sending the plurality of extracted features to a neural network of an artificial neural network module 186 of the plurality of analysis modules 174.

The method proceeds by 216 matching the plurality of extracted features of the sensor signal 64, 164 to a plurality of predetermined matching classes using the neural network of the artificial neural network module 186. The method also includes 218 classifying the plurality of extracted features of the sensor signal 64, 164 according to the matching of the plurality of extracted features of the sensor signal 64, 164 to the plurality of predetermined matching classes. According to an aspect, the step of 218 classifying the plurality of extracted features of the sensor signal 64, 164 according to the matching of the plurality of extracted features of the sensor signal 64, 164 to the plurality of predetermined matching classes can include the step of 220 applying an envelope filter to the sensor signal 64, 164 in the time domain to generate a first signature feature of the plurality of extracted features using the electronic control unit 66, 166.

If the sensor signal 64, 164 has been transformed to the frequency domain, the method could include the steps of analyzing the frequency domain representation of the sensor signal 64, 164 using a plurality of analysis modules 74, 174 of the electronic control unit 66, 166 and determining whether the frequency domain representation of the sensor signal 64, 164 associated with the motion of the object is the valid activation gesture by a user 24 required to move the closure member using the plurality of analysis modules 74, 174. According to another aspect, the method can include the steps of receiving the frequency domain representation of the sensor signal 64 using a motion detector module 78 of the plurality of analysis modules 74 and identifying at least one peak of the frequency domain representation of the sensor signal 64 having a peak amplitude at a peak frequency using the motion detector module 78. The method could proceed by determining if the peak amplitude is less than a first predetermined amplitude a1 and greater than a second predetermined amplitude a2 using the motion detector module 78 and determining if the peak frequency is greater than a first predetermined frequency ft and less than a second predetermined frequency f2 using the motion detector module 78. Next, registering the at least one peak as at least one registered foot motion in response to the peak amplitude being less than the first predetermined amplitude a1 and greater than the second predetermined amplitude a2 and the peak frequency being greater than the first predetermined frequency ft and less than the second predetermined frequency f2 using the motion detector module 78. The step of analyzing the frequency domain representation of the sensor signal 64, 164 using the plurality of analysis modules 74, 174 of the electronic control unit 66, 166 can include the steps of receiving the frequency domain representation of the sensor signal 164 for a foot in motion and a foot out motion using a feature extraction module 182 of the plurality of analysis modules 174 and identifying a plurality of features of the frequency domain representation of the sensor signal 164 using the feature extraction module 182. Then, outputting the plurality of features of the frequency domain representation of the sensor signal 164 using the feature extraction module 182.

According to yet another aspect, the method can also include the step of receiving a foot in motion from the motion detector module 78 using a decision algorithm module 80 of the plurality of analysis modules 74. Next, registering the foot in motion as a first detection using the decision algorithm module 80 and waiting for a predetermined time using the decision algorithm module 80. The method can also include the steps of determining if the foot in motion is held for the predetermined time using the decision algorithm module 80 and receiving the foot out motion from the motion detector module 78 using the decision algorithm module 80. Then, the method can continue by registering the foot out motion as a second detection using the decision algorithm module 80 and determining if the foot out motion is completed within a time delay using the decision algorithm module 80. The method could also include registering the correct activation gesture in response to determining that the foot in motion is held for the predetermined time and the foot out motion is completed within a time delay using the decision algorithm module 80 and waiting for another first detection. The method may also include the steps of resetting in response to determining that the foot in motion is not held for the predetermined time using the decision algorithm module 80 and resetting in response to determining that the foot out motion is not completed within the time delay using the decision algorithm module 80. Similarly, the method could also include the step of ignoring the at least one peak in response to at least one of the peak amplitude being greater than the first predetermined amplitude a1 and the peak amplitude being less than the second predetermined amplitude a2 and the peak frequency being less than the first predetermined frequency f1 and the peak frequency being greater than the second predetermined frequency f2 using the decision algorithm module 80.

According to another aspect, the step of 218 classifying of the plurality of extracted features of the sensor signal 64, 164 according to the matching of the plurality of extracted features of the sensor signal 64, 164 to the plurality of predetermined matching classes can include the step of 222 receiving the sensor signal 64, 164 using a plurality of analysis modules 74, 174. Next, 224 determining if the plurality of extracted features match with a predetermined speed class of the plurality predetermined matching classes associated with the valid activation gesture using the plurality of analysis modules 74, 174. The method can then proceed by 226 determining if the plurality of extracted features match with a predetermined distance class of the plurality predetermined matching classes associated with the valid activation gesture using the plurality of analysis modules 74, 174. The method can also include the step of 228 determining if the plurality of extracted features match with a predetermined angle class of the plurality predetermined matching classes associated with the valid activation gesture using the plurality of analysis modules 74, 174. The method can proceed by 230 determining if the plurality of extracted features match with a predetermined size class of the plurality predetermined matching classes associated with the valid activation gesture using the plurality of analysis modules 74, 174. The method can proceed by 231 determining if the plurality of extracted features match with a predetermined shape class of the plurality predetermined matching classes associated with the valid activation gesture using the plurality of analysis modules 74, 174. Next, the method can include 232 registering the plurality of extracted features as the valid activation gesture in response to the plurality of extracted features matching the predetermined speed class and/or the predetermined distance class and/or the predetermined angle class and/or the predetermined size class and/or the predetermined shape class of the plurality predetermined matching classes associated with the valid activation gesture within a predetermined period of time using the plurality of analysis modules 74, 174.

The method can continue with the step of 234 initiating movement of the closure member 14 in response to the plurality of extracted features matching at least one of the plurality predetermined matching classes associated with a valid activation gesture using the electronic control unit 66, 166.

As discussed above, the neural network included as part of the plurality of analysis modules 174 can include a plurality of layers each having a plurality of neurons weighted by a plurality of neuron weights and interconnected by connections weighted by a plurality of connection weights and the method further includes the step of 236 training the plurality of neuron weights and the plurality of connection weights of the neural network based on a sample set associated with the valid activation gesture. In addition, since the recognition stage module 184 can include a neural network training module 188, the method can include the step of receiving a plurality of initial training sets of the plurality of features of the frequency domain representation or time domain of the sensor signal 164 using a neural network training module 188 of the recognition stage module 184. Also, the method can include adjusting the plurality of neuron weights and the plurality of connection weights based on the plurality of initial training sets of the plurality of features of the frequency domain representation of the sensor signal 164 using the neural network training module 188. The method may also include the step of receiving a plurality of later training sets of the plurality of features of the frequency domain representation of the sensor signal 164 using the neural network training module 188. The method may also include the step of adjusting the plurality of neuron weights and the plurality of connection weights based on the plurality of later training sets of the plurality of features of the frequency domain representation of the sensor signal 164 using the neural network training module 188.

Clearly, changes may be made to what is described and illustrated herein without departing from the scope defined in the accompanying claims. The system 10, 110 may be operable for any kind of different closure member or device incorporated within the motor vehicle 12, for example and advantageously improves upon capacitive sensing solutions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example user-activated, non-contact power closure member system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A radar detection system for user-activated, non-contact activation of a powered closure member coupled to a vehicle body of a vehicle, comprising:
   at least one radar sensor assembly including at least one transmit antenna for transmitting waves and at least one receive antenna for receiving the waves after reflection from an object in a detection zone and coupled to the vehicle body for sensing an object in the detection zone and outputting a sensor signal corresponding to the object in the detection zone based on the waves received by the at least one receive antenna; and
   an electronic control unit coupled to said at least one radar sensor assembly to determine a speed and an amplitude using the sensor signal corresponding to the at least one of a motion and a position of an object relative to the at least one radar sensor assembly;
   wherein said electronic control unit is adapted to analyze the speed and the amplitude to determine when the object is performing an activation gesture in the detection zone;
   wherein said electronic control unit is configured to control movement of the closure member when the object is determined to be performing the activation gesture in the detection zone;
   wherein said electronic control unit is configured to initiate movement of the powered closure member in response to the activation gesture corresponding to a valid activation gesture; and
   wherein said electronic control unit is configured to characterize the motion of the object only using the speed and the amplitude.

2. The radar detection system of claim 1, wherein the electronic control unit is configured to determine if the object is performing an activation gesture in the detection zone by analyzing only the speed and the amplitude.

3. The radar detection system of claim 1, wherein the at least one transmit antenna is configured to transmit continuous waves.

4. The radar detection system of claim 1, wherein the at least one transmit antenna is configured to transmit frequency modulated continuous waves and the electronic control unit is further configured to determine a distance of the object relative to the at least one radar sensor assembly using the frequency modulated continuous waves sensed by the at least one receive antenna.

5. The radar detection system of claim 1, wherein at least one radar sensor assembly includes a radar transceiver circuit coupled to the electronic control unit, wherein the radar transceiver circuit is configured to output the sensor signal having a Doppler frequency.

6. The radar detection system of claim 5, wherein the at least one transmit antenna is a single transmit antenna and the at least one receive antenna is a single receive antenna, and wherein the radar transceiver circuit includes an oscillator coupled to the single transmit antenna and includes a mixer coupled to the oscillator and to the single receive antenna to output the Doppler frequency to the electronic control unit.

7. The radar detection system of claim 6, wherein said electronic control unit is adapted receive the Doppler frequency and determine the speed and the amplitude representative of the motion and position of the object using the sensor signal.

8. The radar detection system of claim 1, wherein the electronic control unit is configured to transform the sensor signal from a time domain representation to a frequency domain representation of the sensor signal and analyze the sensor signal in the frequency domain.

9. The radar detection system of claim 8, wherein the electronic control unit is configured determine if the frequency domain representation of the sensor signal has a speed component within a predetermined speed threshold and an amplitude component within a predetermined amplitude threshold to determine if the object is performing an activation gesture in the detection zone.

10. The radar detection system of claim 1, wherein the object is a foot and the activation gesture is a foot gesture.

11. The radar detection system of claim 1, wherein the object is a user and the activation gesture comprises a motion of the user, then followed by a non-motion of the user, then followed by another motion of the user.

12. The radar detection system of claim 1, wherein the electronic control unit is further configured to sense a fob and activate the at least one radar sensor assembly in response to sensing the fob.

13. A method of controlling movement of a closure member using a radar detection system for user-activated, non-contact operation of the closure member coupled to a vehicle body of a vehicle, comprising:
  transmitting waves using least one transmit antenna of at least one radar sensor assembly;
  receiving the waves after reflection from an object in a detection zone and using at least one receive antenna of the at least one radar sensor assembly coupled to the vehicle body;
  outputting a sensor signal based on the waves received by the at least one receive antenna;
  transforming the sensor signal from a time domain representation to a frequency domain representation of the sensor signal and analyzing the frequency domain representation of the sensor signal to determine a speed and an amplitude from the sensor signal corresponding to motion characteristics of the object;
  analyzing the speed and the amplitude to determine when the object is performing an activation gesture in the detection zone; and
  controlling movement of the closure member when the object is determined to be performing the activation gesture in the detection zone.

14. The method of claim 13 wherein only the speed and the amplitude are determined from the sensor signal.

15. The method of claim 13, wherein transmitting waves comprises using a single transmit antenna for transmitting continuous waves.

16. The method of claim 15, wherein transmitting waves comprises transmitting continuous waves within an ISM frequency band.

17. The method of claim 13, wherein transmitting waves using at least two transmit antenna of at least one radar sensor assembly comprises transmitting frequency modulated continuous waves.

18. The method of claim 13, wherein outputting a sensor signal based on the waves received by the at least one receive antenna comprises outputting a signal having a Doppler frequency.

19. A radar detection system for user-activated, non-contact activation of a powered closure member coupled to a vehicle body of a vehicle, comprising:
  at least one radar sensor assembly including at least one transmit antenna for transmitting waves and at least one receive antenna for receiving the waves after reflection from an object in a detection zone and coupled to the vehicle body for sensing an object in the detection zone and outputting a sensor signal corresponding to the object in the detection zone based on the waves received by the at least one receive antenna; and
  an electronic control unit coupled to said at least one radar sensor assembly to determine a speed and an amplitude using the sensor signal corresponding to the at least one of a motion and a position of an object relative to the at least one radar sensor assembly;
  wherein said electronic control unit is adapted to analyze the speed and the amplitude to determine when the object is performing an activation gesture in the detection zone;
  wherein said electronic control unit is configured to control movement of the closure member when the object is determined to be performing the activation gesture in the detection zone;
  wherein said electronic control unit is configured to initiate movement of the powered closure member in response to the activation gesture corresponding to a valid activation gesture; and
  wherein said electronic control unit is configured to transform the sensor signal from a time domain representation to a frequency domain representation of the sensor signal and analyze the sensor signal in the frequency domain.

20. The system of claim 19, wherein the electronic control unit is configured to determine the activation gesture is the valid activation gesture using predetermined frequency domain thresholds.

* * * * *